US012486883B2

(12) United States Patent
Liu et al.

(10) Patent No.: US 12,486,883 B2
(45) Date of Patent: Dec. 2, 2025

(54) INTERNAL MAGNETIC CONTROL DEVICE, FLYWHEEL ASSEMBLY AND FITNESS EQUIPMENT

(71) Applicant: Ningbo Delconix Technologies Co., Ltd., Yuyao (CN)

(72) Inventors: Weihong Liu, Yuyao (CN); Wei Qiao, Yuyao (CN)

(73) Assignee: Ningbo Delconix Technologies Co., Ltd., Ningbo (CN)

( * ) Notice: Subject to any disclaimer, the term of this patent is extended or adjusted under 35 U.S.C. 154(b) by 121 days.

(21) Appl. No.: 18/568,245

(22) PCT Filed: Apr. 25, 2022

(86) PCT No.: PCT/CN2022/088939
§ 371 (c)(1),
(2) Date: Dec. 7, 2023

(87) PCT Pub. No.: WO2022/214103
PCT Pub. Date: Oct. 13, 2022

(65) Prior Publication Data
US 2024/0209917 A1    Jun. 27, 2024

(30) Foreign Application Priority Data

Apr. 8, 2021   (CN) ..................... 202120715770.X
May 8, 2021   (CN) ..................... 202120973894.8
(Continued)

(51) Int. Cl.
*F16F 15/30*    (2006.01)
*A63B 21/005*   (2006.01)
*H02K 49/10*    (2006.01)

(52) U.S. Cl.
CPC ............ *F16F 15/30* (2013.01); *A63B 21/005* (2013.01); *H02K 49/104* (2013.01)

(58) Field of Classification Search
CPC ...... F16F 15/30; A63B 21/005; H02K 49/104
See application file for complete search history.

(56) References Cited

U.S. PATENT DOCUMENTS 5,627,419 A * 5/1997 Miller ................. H02K 21/027
                                                  290/38 A
6,345,703 B1 * 2/2002 Peng ...................... F16F 15/035
                                                  188/164
(Continued)

FOREIGN PATENT DOCUMENTS

CN        203263672 U    11/2013
CN        104001304 A     8/2014
(Continued)

*Primary Examiner* — Thomas C Diaz
(74) *Attorney, Agent, or Firm* — Che-Yang Chen

(57) ABSTRACT

Disclosed are an internal magnetic control device, a flywheel assembly and a fitness equipment, wherein the flywheel assembly comprises a flywheel, an internal magnetic control device and a speed measuring device, wherein the internal magnetic control device comprises a housing unit, a driving unit, two swing arms and two sets of magnetic elements, wherein the driving unit is arranged at the housing unit; a pivoting end of each of the swing arms is rotatably mounted at the housing unit; a driven end of each of the swing arms is rotatably connected to the driving unit; the two sets of the magnetic elements are respectively arranged at each of the swing arms; wherein the flywheel is rotatably arranged around the internal magnetic control device, wherein the speed measuring device comprises a sensing element and an acting member.

2 Claims, 16 Drawing Sheets

(30) Foreign Application Priority Data

Feb. 16, 2022 (CN) .......................... 202210142907.6
Feb. 16, 2022 (CN) .......................... 202220313114.1
Feb. 16, 2022 (CN) .......................... 202220313122.6

(56) References Cited

U.S. PATENT DOCUMENTS

| | | | | |
|---|---|---|---|---|
| 6,360,855 B1* | 3/2002 | Szu-Yin | ............. | A63B 21/0051 |
| | | | | 188/164 |
| 6,719,107 B1* | 4/2004 | Chen | ......................... | H02P 3/04 |
| | | | | 188/164 |
| 7,018,324 B1* | 3/2006 | Lin | .................... | A63B 21/0053 |
| | | | | 188/164 |
| 7,695,406 B2* | 4/2010 | Waters | .................... | A63F 13/22 |
| | | | | 482/8 |
| 11,689,091 B2* | 6/2023 | Lee | ..................... | A63B 21/225 |
| | | | | 310/93 |
| 2002/0166737 A1* | 11/2002 | Chen | ..................... | H02K 49/043 |
| | | | | 188/74 |
| 2003/0070889 A1 | 4/2003 | Lin | | |
| 2018/0117401 A1* | 5/2018 | Chen | .................. | A63B 22/0605 |

FOREIGN PATENT DOCUMENTS

| | | |
|---|---|---|
| CN | 212166399 U | 12/2020 |
| CN | 113663278 A | 11/2021 |
| CN | 113842598 A | 12/2021 |
| CN | 113908485 A | 1/2022 |
| CN | 113975711 A | 1/2022 |
| CN | 216812693 U | 6/2022 |
| CN | 216812694 U | 6/2022 |
| WO | 2020028883 A1 | 2/2020 |

* cited by examiner

INTERNAL MAGNETIC CONTROL DEVICE, FLYWHEEL ASSEMBLY AND FITNESS EQUIPMENT

CROSS REFERENCE OF RELATED APPLICATION

This application claims the benefit under 35 U.S.C. § 119 from International Application No. PCT/CN2022/088939, which claims priorities to CN 202120715770.X, filed Apr. 8, 2021, CN 202120973894.8, filed May 8, 2021, CN 202210142907.6, filed Feb. 16, 2022, CN 202220313114.1, filed Feb. 16, 2022 and CN 202220313122.6, filed Feb. 16, 2022, the entire contents of which are hereby incorporated by reference in their entireties for teachings of additional or alternative details, and/or features.

FIELD OF INVENTION

The present invention relates to the field of fitness equipment, and specially relates to an internal magnetic control device, flywheel assembly and fitness equipment.

DESCRIPTION OF RELATED ARTS

The internal magnetic control device is widely used in various fitness equipment, such as elliptical machines, dynamic bicycles, etc. The fitness equipment of the internal magnetic control device can meet users to choose different resistance according to physical strength, endurance and fitness needs. Taking an elliptical machine as an example, the elliptical machine comprises a body bracket, a drive wheel mounted on the body bracket, two pedals to drive the drive wheel, a flywheel drivably connected to the drive wheel, and an internal magnetic control device held on the inside of the flywheel. A user, when stepping on the pedals, drives the drive wheels to rotate relative to the body bracket, the drive wheels drive the flywheel to rotate, and the flywheel acquires resistance by cutting the magnetic inductance lines of the internal magnetic control device as it rotates relative to the internal magnetic control device. Moreover, the mutual distance between the internal magnetic control device and the flywheel is allowed to be adjusted such that when the internal magnetic control device is close to the flywheel, the flywheel is subjected to increased magnetic resistance during rotation and the user's fitness intensity increases, and when the internal magnetic control device is far away from the flywheel, the flywheel is subjected to decreased magnetic resistance during rotation and the user's fitness intensity decreases.

Although the existing internal magnetic control device can satisfy the fitness equipment with a certain resistance adjustment function, in actual use, due to the limitation of the structure of the existing internal magnetic control device, the distance between the internal magnetic control device and the flywheel that can be adjusted is small, resulting in the resistance of the fitness equipment to be adjusted in a small range, and the difference between the highest level and the lowest level of resistance is not obvious. Even if the user adjusts the resistance level of the exercise equipment, the actual perceived change in resistance is not obvious, and the exercise process is monotonous, which does not meet the user's expectations and does not satisfy the user's exercise needs. In addition, the resistance adjustment mechanism of the existing exercise equipment has a complex structure, and the precision requirements for the coordination between multiple parts are high, and in actual use, the adjustment is often not smooth, and the failure rate of parts coordination is high, which not only affects the user's experience, but also increases the user's maintenance costs.

SUMMARY OF THE PRESENT INVENTION

An object of the present invention is to provide a flywheel having a speed measuring device.

According to a flywheel provided by the present invention, it comprises an inertial flywheel, a magnetic control disk and a speed measuring device, wherein the magnetic control disk is coaxially disposed in the inertial flywheel, the magnetic control disk is rotationally coupled with the inertial flywheel, and a gap is defined between a side wall of the magnetic control disk and an inner wall of the inertial flywheel, wherein the speed measuring device comprising an acting member and a sensing element, the acting member is disposed at the inertial flywheel, the sensing element is provided on the magnetic control disk, and the acting member and the sensing element are disposed in correspondence.

Preferably, the magnetic control disk comprises a disk cover, a disk holder, and a magnetic ring, wherein the magnetic ring is provided on a peripheral side of the disk holder, and the disk cover is provided on a side of the disk holder, which is close to an outside of the inertial flywheel.

Preferably, the inertial flywheel is connected to the magnetic disk through a central shaft, wherein the central shaft is coaxially threaded through the magnetic disk and tightly connected thereto, and the central shaft is coaxially threaded through the inertial flywheel and rotationally cooperated therewith.

Preferably, a fixing flange is provided in a middle of the magnetic control disk, and the central shaft is threaded through the fixing flange and tightly connected thereto.

Preferably, the magnetic control disk is provided with a PCB board, and the sensing element is mounted at the PCB board.

Preferably, the PCB board is connected to an external terminal signal through a communication interface and/or a wireless connection.

Preferably, the acting member comprises a magnet and the sensing element comprises a magnetic sensing element.

Preferably, the magnetic sensing element comprises a Hall sensing element.

Preferably, the acting member comprises an infrared reflecting area, and the sensing element comprises an infrared emitting tube and an infrared receiving tube.

Compared with the prior art, the present invention has the following beneficial effects:

1. The present invention cooperates by means of the acting member provided at the inertial flywheel and the sensing element provided at the magnetic control disk, so that when the sensing element generates two consecutive sensing signals, the inertial flywheel rotates for one circle, and then calculates the interval time between the two consecutive sensing signals by the sensing element through the aid of an external terminal computer, so as to calculate the rotation speed of the inertial flywheel, which contributes to the improvement of the convenience of measuring the rotation speed of the inertial flywheel, and is efficient and simple, accurate and reliable.

2. The present invention helps to reduce the occurrence of damage to the acting member and the sensing element due to impact and touching by external forces, and helps to improve the stability of speed measurement, by installing the acting member and the sensing element in the inertial flywheel and an interior of the magnetic control disk respectively.

3. The present invention helps to improve the accuracy of the measurement results by mounting the acting member directly on the inertial flywheel and calculating the straight line distance of the inertial flywheel movement by multiplying the rotation speed by the circumference.

A purpose of the present invention is to provide an adjusting device having an internal magnetic controller integrated with magnetic resistance and a fitness and sport equipment.

An adjusting device having an internal magnetic controller integrated with magnetic resistance provided by the present invention, comprising a motor, a driving mechanism, a rotating wheel, a magnetic ring, a connecting rod and a base, wherein the motor is connected to the driving mechanism and drives the driving mechanism; the driving mechanism cooperates with the rotating wheel and drives the rotating wheel to rotate; one end of the connecting rod cooperates with the rotating wheel, and another end of the connecting rod is connected with the magnetic ring; the rotating wheel is provided in a central position of the base.

Preferably, the connecting rod is rotationally and symmetrically provided on the rotating wheel.

Preferably, the number of connecting rods is two.

Preferably, the ends of the connecting rods are symmetrically provided on the rotating wheel.

Preferably, there is also a circular sleeve provided on the base, and the rotating wheel cooperates with the circular sleeve.

Preferably, one end of the magnetic ring is rotatably attached at the base, and another end is a movable end, and the movable end is driven to move by the connecting rod.

Preferably, the number of magnetic rings is one or more, rotationally and symmetrically provided on the base.

Preferably, the number of magnetic rings is two, rotationally and reverse symmetrically provided on the base.

Preferably, the driving mechanism is a driving gear assembly, and an outer edge of the rotating wheel is provided with gears that cooperate with the driving gear assembly.

An object of the present invention is to provide an adjusting device and a fitness and sport equipment, which employ above internal magnetic controller integrated with magnetic resistance.

Compared with the prior art, the present invention has the following beneficial effects:

1. The connecting rod adopts a rotational and symmetrical layout, which skillfully circumvents the sharp return characteristic of the four connecting rod mechanism and ensures the symmetry and consistency of the moving distance between the left and right sides, thus solving the inconsistency of damping between the left and right sides due to the inconsistency of the clearance distance, and improving the exercise experience.

2. Substantially increasing the support area of the rotating wheel during rotation, the force points are more decentralized and uniform, and its dynamic smoothness is substantially improved, solving the problem that the left and right magnetic rings can only be adjusted within a small range, and increasing the adjustment range of the left and right magnetic rings.

3. The dynamic stability of the flywheel during the adjustment of the flywheel resistance is improved, and the life is extended.

An object of the present invention is to provide an internal magnetic control device, a flywheel assembly, and a fitness equipment, wherein a slider of the internal magnetic control device is capable of driving two swinging arms to swing as it slides along a track to adjust the distance between a set of magnetic elements being disposed on each of the swinging arms and a flywheel surrounding the internal magnetic control device, so as to regulate the load of the flywheel as it is driven while rotating.

An object of the present invention is to provide an internal magnetic control device, a flywheel assembly, and a fitness equipment, wherein a drive ring of the internal magnetic control device is capable of driving two swinging arms to swing while rotating about a center axis to adjust the distance between each set of magnetic elements being disposed on each of the swinging arms and each flywheel surrounding the internal magnetic control device, so as to regulate the load of the flywheel as it is driven while rotating.

An object of the present invention is to provide an internal magnetic control device, a flywheel assembly, and a fitness equipment, wherein the flywheel assembly is provided with a speed measuring device to directly measure the speed of the flywheel for directly measuring the rotation speed of the flywheel, wherein the speed measuring device of the present invention has a much greater effect on the rotational speed of the flywheel, as opposed to the conventional method of measuring the rotational speed of the flywheel by measuring the pedaling assembly of the fitness equipment and converting the ratio of rotational speeds of the pedaling assembly and flywheel, by directly measuring the rotation speed of the flywheel.

According to another aspect of the present invention, the present invention further provides a flywheel assembly, which comprises:

a flywheel;

an internal magnetic control device comprising a housing unit, a driving unit, two swing arms and two sets of magnetic elements, wherein the driving unit is arranged at the housing unit, a pivoting end of each of the swing arms is rotatably mounted at the housing unit, a driven end of each of the swing arms is rotatably connected to the driving unit, the two sets of the magnetic elements are respectively arranged at each of the swing arms, wherein the flywheel is rotatably arranged around the internal magnetic control device; and a speed measuring device comprising a sensing element and an acting member, wherein the sensing element is arranged at one of the flywheel and the internal magnetic control device, the acting member is arranged at another of the flywheel and the internal magnetic control device, and a position of the sensing element and a position of the acting member are capable of being corresponded to each other.

According to an embodiment of the present invention, the sensing element is a Hall element provided in the internal magnetic control device, and the acting member is a magnet provided in the flywheel.

According to an embodiment of the present invention, the flywheel comprises a flywheel disc, a flywheel ring and a flywheel space, wherein the flywheel ring is integrally extended along a periphery of the flywheel disc to define the flywheel space between the flywheel disk and the flywheel ring, wherein the internal magnetic control device is retained in the flywheel space of the flywheel, and the acting member is provided at the flywheel disk.

According to an embodiment of the present invention, the flywheel has an embedding groove formed in the flywheel disc, wherein the acting member is embedded in the embedding groove of the flywheel.

According to an embodiment of the present invention, the driving unit further comprise a driving motor, a slider and two connecting arms, wherein the driving motor is installed at the housing unit, wherein the housing unit has a track extended from an edge of the housing unit to a middle portion of the housing unit, and the slider is slidably mounted at the track of the housing unit and is drivably connected to the driving motor, wherein one end of each of the connecting arms is rotatably mounted at each of two opposite sides of the slider, and another end of each of the two connecting arm is rotatably mounted at the driven end of each swing arm.

According to an embodiment of the present invention, the driving unit further comprise a driving motor, a driving ring and two connecting arms, wherein the driving motor is installed at the housing unit, wherein the driving ring is slidably mounted at the housing unit and is configured to rotate around a central axis, wherein one end of each of the connecting arms is rotatably mounted at each of two opposite sides of the driving ring, and another end of each of the two connecting arm is rotatably mounted at the driven end of each swing arm.

According to an embodiment of the present invention, the driving unit comprises a transmission gear assembly having a plurality of gears engaged with each other, wherein one gear of the transmission gear assembly is engaged with an output shaft of the driving motor, another gear of the transmission gear assembly is engaged with at least one slider teeth of the slider.

According to an embodiment of the present invention, the driving unit comprises a transmission gear assembly having a plurality of gears engaged with each other, wherein one gear of the transmission gear assembly is engaged with an output shaft of the driving motor, another gear of the transmission gear assembly is engaged with at least one first ring tooth of the driving ring.

According to an embodiment of the present invention, the driving unit comprises an auxiliary gear, the auxiliary gear is rotatably mounted at the housing unit, and the auxiliary gear is engaged with at least one second ring tooth, wherein the first ring tooth and the second ring tooth of the driving ring are respectively located at two opposite sides of the driving ring.

According to another aspect of the present invention, the present invention further provides a fitness equipment, which comprises:
an equipment rack;
a pedaling assembly, wherein the pedaling assembly is mounted at the equipment rack in a pedalably manner; and
a flywheel assembly comprising:
a flywheel;
an internal magnetic control device comprising a housing unit, a driving unit, two swing arms and two sets of magnetic elements, wherein the driving unit is arranged at the housing unit, a pivoting end of each of the swing arms is rotatably mounted at the housing unit, a driven end of each of the swing arms is rotatably connected to the driving unit, the two sets of the magnetic elements are respectively arranged at the two swing arms to provide a magnetic field in the periphery opening and provided to swing synchronously with the two swinging arms, wherein the flywheel is rotatably arranged around the internal magnetic control device; and
a speed measuring device comprising a sensing element and an acting member, wherein the sensing element is arranged at one of the flywheel and the internal magnetic control device, the acting member is arranged at another of the flywheel and the internal magnetic control device, and a position of the sensing element and a position of the acting member are capable of being aligned with each other, wherein the internal magnetic control device of the flywheel assembly is mounted at the equipment rack and the flywheel is drivably connected to the pedaling assembly.

According to another aspect of the present invention, the present invention further provides a flywheel assembly, which comprises:
an internal magnetic control device;
a flywheel configured to rotatably surround the internal magnetic control device;
a speed measuring device, wherein the speed measuring device comprises a sensing element and an acting member, wherein one of the sensing element and the acting member is disposed in the internal magnetic control device, another of the sensing element and the acting member is provided at the flywheel, and a position of the sensing element is corresponded to a position of the acting member, wherein the sensing element comprises an infrared emitting tube and an infrared receiving tube, and the acting member comprises an infrared reflecting area, wherein the infrared reflecting area is able to reflect an infrared ray emitted by the infrared emitting tube, and the infrared receiving tube is able to receive an infrared ray reflected by the infrared reflecting area.

According to an embodiment of the present invention, the flywheel comprises a flywheel disc, a flywheel ring and a flywheel space, wherein the flywheel ring is integrally extended along a periphery of the flywheel disc to define the flywheel space between the flywheel disk and the flywheel ring, wherein the internal magnetic control device is retained in the flywheel space of the flywheel, and the infrared reflecting area is provided at the flywheel disk of the flywheel.

According to an embodiment of the present invention, the internal magnetic control device comprising a housing unit, a driving unit, two swing arms and two sets of magnetic elements, wherein the driving unit is arranged at the housing unit, a pivoting end of each of the swing arms is rotatably mounted at the housing unit, a driven end of each of the swing arms is rotatably connected to the driving unit, the two sets of the magnetic elements are respectively arranged at each of the swing arms.

According to an embodiment of the present invention, the driving unit further comprise a driving motor, a slider and two connecting arms, wherein the driving motor is installed at the housing unit, wherein the housing unit has a track extended from an edge of the housing unit to a middle portion of the housing unit, and the slider is slidably mounted at the track of the housing unit and is drivably connected to the driving motor, wherein one end of each of the connecting arms is rotatably mounted at each of two opposite sides of the slider, and another end of each of the two connecting arm is rotatably mounted at the driven end of each swing arm.

According to an embodiment of the present invention, the driving unit further comprise a driving motor, a driving ring and two connecting arms, wherein the driving motor is installed at the housing unit, wherein the driving ring is slidably mounted at the housing unit and is configured to rotate around a central axis, wherein one end of each of the connecting arms is rotatably mounted at each of two opposite sides of the driving ring, and another end of each of the two connecting arm is rotatably mounted at the driven end of each swing arm.

According to an embodiment of the present invention, the driving unit comprises a transmission gear assembly having a plurality of gears engaged with each other, wherein one gear of the transmission gear assembly is engaged with an output shaft of the driving motor, another gear of the transmission gear assembly is engaged with at least one slider teeth of the slider.

According to an embodiment of the present invention, the driving unit comprises a transmission gear assembly having a plurality of gears engaged with each other, wherein one gear of the transmission gear assembly is engaged with an output shaft of the driving motor, another gear of the transmission gear assembly is engaged with at least one first ring tooth of the driving ring.

According to an embodiment of the present invention, the driving unit comprises an auxiliary gear, the auxiliary gear is rotatably mounted at the housing unit, and the auxiliary gear is engaged with at least one second ring tooth, wherein the first ring tooth and the second ring tooth of the driving ring are respectively located at two opposite sides of the driving ring.

According to an embodiment of the present invention, the internal magnetic control device further includes a potential control unit, the potential control unit comprises a circuit board and a sliding potentiometer, wherein the circuit board is mounted at the housing unit, a potentiometer body of the sliding potentiometer is attached or welded to the circuit board, and a sliding arm of the sliding potentiometer is connected at the slider of the driving unit.

According to an embodiment of the present invention, the internal magnetic control device further comprises a potential control unit, wherein the potential control unit comprises a circuit board and a rotary potentiometer, wherein the circuit board is mounted at the housing unit, the rotary potentiometer is connected at the circuit board, and the auxiliary gear is installed at a shaft end of the rotary potentiometer.

According to another aspect of the present invention, the present invention further provides a fitness equipment, which comprises:
  an equipment rack;
  a pedaling assembly, wherein the pedaling assembly is mounted at the equipment rack in a pedalably manner; and
  a flywheel assembly comprising:
  an internal magnetic control device;
  a flywheel configured to rotatably surround the internal magnetic control device;
  a speed measuring device, wherein the speed measuring device comprises a sensing element and an acting member, wherein one of the sensing element and the acting member is disposed in the internal magnetic control device, another of the sensing element and the acting member is provided at the flywheel, and a position of the sensing element is corresponded to a position of the acting member, wherein the sensing element comprises an infrared emitting tube and an infrared receiving tube, and the acting member comprises an infrared reflecting area, wherein the infrared reflecting area is able to reflect an infrared ray emitted by the infrared emitting tube, and the infrared receiving tube is able to receive an infrared ray reflected by the infrared reflecting area, wherein the internal magnetic control device of the flywheel assembly is mounted at the equipment rack, the flywheel is drivably connected to the pedaling assembly.

According to another aspect of the present invention, the present invention further provides an internal magnetic control device, which comprises:
  a housing unit;
  two sets of magnetic elements;
  two swing arms, wherein a pivoting end of each of the swing arms is rotatably mounted at the housing unit, and the two swing arms are centrally symmetrical;
  a driving unit further comprising a driving motor, a driving ring and two connecting arms, wherein the driving motor is installed at the housing unit, wherein the driving ring is slidably mounted at the housing unit and is configured to rotate around a central axis, wherein one end of each of the connecting arms is rotatably mounted at the driven end of each swing arm, another end of each of the two connecting arm is rotatably mounted at two opposite sides of the driving ring.

According to an embodiment of the present invention, the driving unit comprises a transmission gear assembly having a plurality of gears engaged with each other, wherein one gear of the transmission gear assembly is engaged with an output shaft of the driving motor, another gear of the transmission gear assembly is engaged with at least one first ring tooth of the driving ring.

According to an embodiment of the present invention, the driving unit comprises an auxiliary gear, the auxiliary gear is rotatably mounted at the housing unit, and the auxiliary gear is engaged with at least one second ring tooth, wherein the first ring tooth and the second ring tooth of the driving ring are respectively located at two opposite sides of the driving ring.

According to an embodiment of the present invention, the internal magnetic control device further comprises a potential control unit, wherein the potential control unit comprises a circuit board and a rotary potentiometer, wherein the circuit board is mounted at the housing unit, the rotary potentiometer is connected at the circuit board, and the auxiliary gear is installed at a shaft end of the rotary potentiometer.

According to another aspect of the present invention, the present invention further provides a flywheel assembly, which comprises:
  a flywheel; and
  an internal magnetic control device, wherein the flywheel is configured to rotatably surround the internal magnetic control device, wherein the internal magnetic control device comprises:
  a housing unit;
  two sets of magnetic elements;
  two swing arms, wherein a pivoting end of each of the swing arms is rotatably mounted at the housing unit, and the two swing arms are centrally symmetrical;
  a driving unit further comprising a driving motor, a driving ring and two connecting arms, wherein the driving motor is installed at the housing unit, wherein the driving ring is slidably mounted at the housing unit and is configured to rotate around a central axis, wherein one end of each of the connecting arms is rotatably mounted at the driven end of each swing arm, another end of each of the two connecting arm is rotatably mounted at two opposite sides of the driving ring.

According to another aspect of the present invention, the flywheel assembly further comprises a speed measuring device comprising a sensing element and an acting member, wherein the sensing element is arranged at the internal magnetic control device, the acting member is arranged at the flywheel, and the sensing element is located at a rotation path of the acting member, so as to allow a position of the sensing element to be corresponded to a position of the acting member.

According to an embodiment of the present invention, the sensing element is a Hall element provided in the internal magnetic control device, and the acting member is a magnet provided in the flywheel.

According to an embodiment of the present invention, the sensing element comprises an infrared emitting tube and an infrared receiving tube, and the acting member comprises an infrared reflecting area, wherein the infrared reflecting area is able to reflect an infrared ray emitted by the infrared emitting tube, and the infrared receiving tube is able to receive an infrared ray reflected by the infrared reflecting area. The flywheel assembly comprises a flywheel disc, a flywheel ring and a flywheel space, wherein the flywheel ring is integrally extended along a periphery of the flywheel disc to define the flywheel space between the flywheel disk and the flywheel ring, wherein the internal magnetic control device is retained in the flywheel space of the flywheel, and the acting member is provided at the flywheel disk.

According to an embodiment of the present invention, the flywheel has an embedding groove formed in the flywheel disc, wherein the acting member is embedded in the embedding groove of the flywheel.

According to another aspect of the present invention, the present invention further provides a fitness equipment, which comprises:
an equipment rack;
a pedaling assembly, wherein the pedaling assembly is mounted at the equipment rack in a pedalably manner; and
a flywheel assembly comprising:
a flywheel; and
an internal magnetic control device, wherein the flywheel is configured to rotatably surround the internal magnetic control device, wherein the internal magnetic control device comprises:
a housing unit;
two sets of magnetic elements;
two swing arms, wherein a pivoting end of each of the swing arms is rotatably mounted at the housing unit, and the two swing arms are centrally symmetrical;
a driving unit further comprising a driving motor, a driving ring and two connecting arms, wherein the driving motor is installed at the housing unit, wherein the driving ring is slidably mounted at the housing unit and is configured to rotate around a central axis, wherein one end of each of the connecting arms is rotatably mounted at the driven end of each swing arm, another end of each of the two connecting arm is rotatably mounted at two opposite sides of the driving ring, wherein the internal magnetic control device of the flywheel assembly is mounted at the equipment rack, the flywheel is drivably connected to the pedaling assembly.

BRIEF DESCRIPTION OF THE DRAWINGS

The above and other objects, features and advantages of the present invention will become more apparent from the detailed description of the embodiments of the present invention in conjunction with the accompanying drawings. The accompanying drawings are used to provide a further understanding of the present invention, constitute a part of the specification, and are used to explain the present invention together with the present invention, and do not constitute a limitation to the present invention. In the drawings, the same reference numbers generally refer to the same components or steps.

DETAILED DESCRIPTION OF THE EMBODIMENTS

Before explaining any embodiments of the present invention, it is to be understood that the present invention, in its application, is not limited to the details of construction and arrangement of the components as set forth in the following description or as illustrated in the following accompanying drawings. The present invention may have other embodiments and can be practiced or carried out in a variety of ways. Further, it should be understood that the wording and terminology used herein is for descriptive purposes and should not be considered limiting. The use of "including," "comprising," or "having" and variations thereof herein is intended to encompass the entries and their equivalents set forth below, as well as additional entries. Unless otherwise specified or limited, the terms "mounting," "connecting," "supporting," and "coupling" and variations thereof are used broadly and in a variety of ways and variants thereof are widely used and cover direct and indirect mounting, connection, support and coupling. Furthermore, "connection" and "coupling" are not limited to physical or mechanical connections or couplings.

Moreover, in a first aspect, in the disclosure of the present invention, the terms "longitudinal", "transverse", "up", "down "vertical", "horizontal", "up", "down", "front", "back", "left", "right", "Vertical", "Horizontal", "Top", "Bottom", "Inner", "outside" and the like indicate orientations or positional relationships based on those shown in the accompanying drawings, which are only for the purpose of facilitating the description of the present invention and simplifying the description, and are not indicative of or suggestive of the necessity for the device or element referred to have a particular orientation, to be constructed and operated in a particular orientation, and therefore the above terms Secondly, the term "one" is to be understood as "at least one" or "one or more", i.e. in one embodiment the number of one element In one embodiment, the number of elements may be one, while in another embodiment, the number of elements may be more than one, and the term "one" is not to be understood as a limitation on the number.

Figure 1:
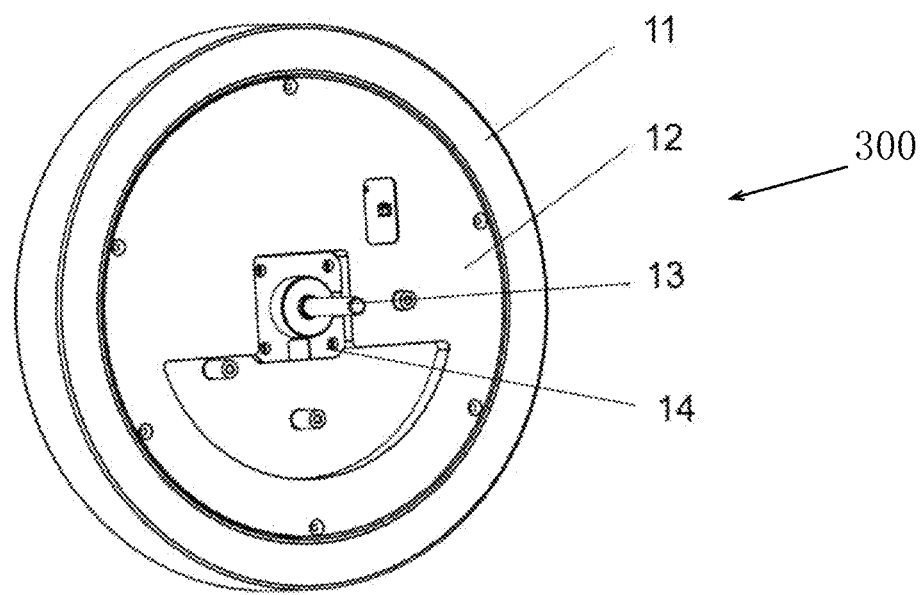
FIG. 1 is a perspective schematic diagram of a flywheel assembly according to a preferred embodiment of the present invention.

As shown in FIG. 1, a flywheel assembly 300 having a speed measuring device is provided according to the present invention comprises an inertial flywheel 11, a magnetic control disk 12, and a speed measuring device 30, wherein the magnetic control disk 12 is coaxially mounted in the inertial flywheel 11, a gap is defined between a sidewall of the magnetic control disk 12 and an inner wall of the inertial flywheel 11, and the inertial flywheel 11 is rotationally coupled with the magnetic control disk 12. The inertial flywheel 11 rotates about its geometric center, and the inertial flywheel 11 is subjected to a magnetic resistance by the magnetic control disk 12 when it is rotating, and the magnetic resistance is adjusted by adjusting the size of the gap between the sidewall of the magnetic control disk 12 and the inner wall of the inertial flywheel 11.

Figure 2:
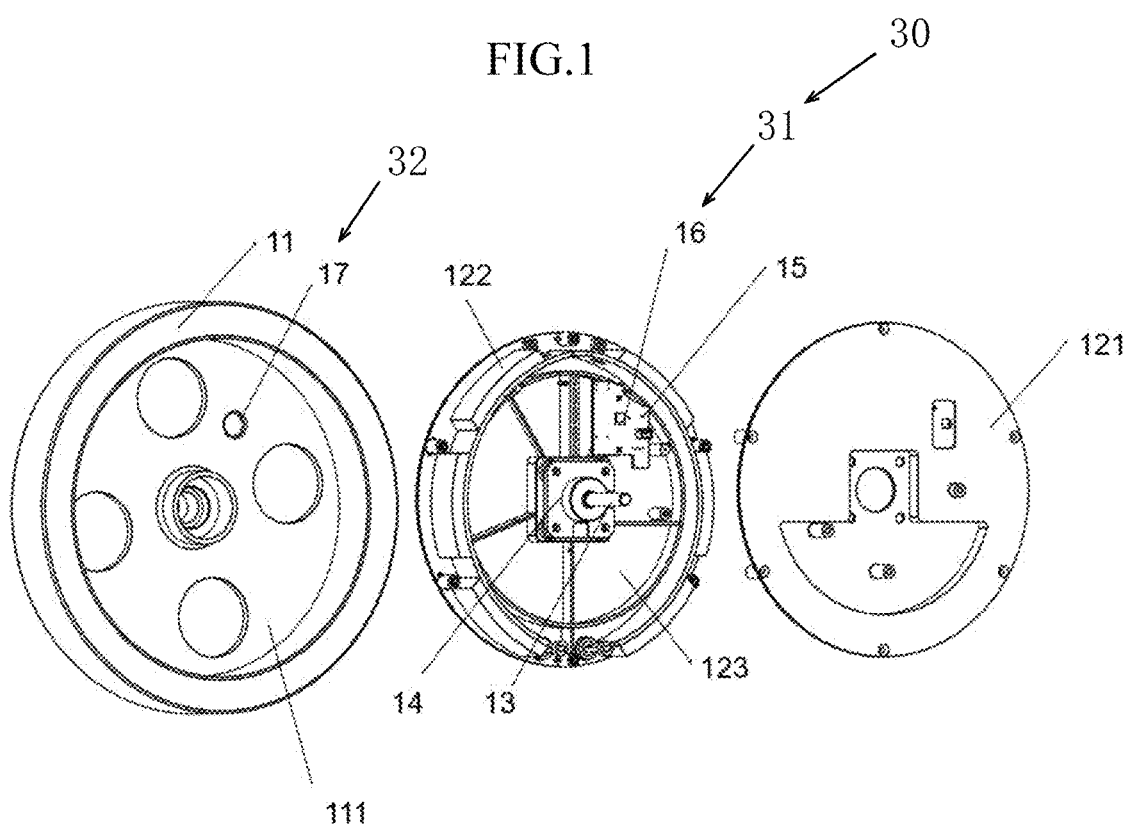
FIG. 2 is an exploded schematic diagram of the flywheel assembly according to the above preferred embodiment of the present invention.

As shown in FIGS. 1 and 2, the inertial flywheel 11 is made of metals that can be attracted by magnets, including iron, cobalt, nickel, and allies containing iron, cobalt, and nickel. The inertial flywheel 11 has a disc shape, and an installation chamber 111 is integrally and coaxially defined in one side of the inertial flywheel 11 and is round. The magnetic control disk 12 is coaxially installed in the installation chamber 111, and a center shaft 13 is connected between the magnetic control disk 12 and the inertial flywheel 11.

The magnetic control disk 12 comprises a disk cover 121, a disk holder 122 and a magnetic ring 123, the disk holder 122 is hollow, a fixing flange 14 is provided at a geometrical center of the disk holder 122 through a bolt, the central shaft 13 is coaxially mounted in a middle of the fixing flange 14 and is fixedly connected thereto, and two ends of the central shaft 13 are respectively threaded through the magnetic control disk 12. One end of the central shaft 13 near the inertial flywheel 11 is coaxially threaded into the inertial flywheel 11 and rotationally connected with the inertial flywheel 11 by a bearing, thereby realizing a rotation of the inertial flywheel 11 around an axis of the central shaft 13 which is relative to the magnetic control disk 12, and thereby realizing a coaxial rotation of the inertial flywheel 11 which is relative to the magnetic control disk 12.

Two groups of magnetic rings 123 are fixedly mounted on a peripheral side of the disk holder 122 at equal intervals, each of the two groups of magnetic rings 123 comprises three magnetic rings 123 close to each other. A magnetic resistance is generated by a cooperation between the six magnetic rings 123 mounted on the peripheral side of the magnetic control disk 12 and the sidewall of the installation chamber 111, and the magnetic resistance is adjusted by adjusting the gap between the magnetic rings 123 and the sidewall of the mounting chamber 111 to regulate the magnitude of the magnetic resistance. The disk cover 121 is coaxially and fixedly mounted at an outer side of the disk holder 122 by bolts, and the center shaft 13 coaxially passes through the disk cover 121.

As shown in FIGS. 1 and 2, a PCB 15 is fixedly mounted on the disk holder 122 by bolts, and the PCB 15 is communicated with an external terminal signal through a communication interface or a wireless connection, and the present application preferably uses a communication interface to communicate with an external terminal signal. The speed measuring device 30 comprises an acting member 32 and a sensing element 31, wherein the acting member 32 is a magnet 17, the magnet 17 is fixedly mounted on a bottom wall of the installation chamber 111, and the magnet 17 is located in a middle of a radius of the bottom wall of the mounting chamber 111. The sensing element 31 is a magnetic sensing element 16, the magnetic sensing element 16 of the present application preferably employs a Hall sensing element and the magnetic sensing element 16 is mounted on the PCB 15 and the magnetic sensing element 16 is electrically connected with the PCB 15 through a circuitry thereof, wherein a position of the magnetic sensing element 16 corresponds to a position of the magnet 17 and the magnetic sensing element 16 is located at a rotation path of the magnet 17.

When the inertial flywheel 11 rotates relative to the magnetic control disk 12, the magnet 17 rotates around the axis of the central axis 13 following the inertial flywheel 11, and when the position of the magnet 17 coincides with the position of the magnetic sensing element 16, the magnetic sensing element 16 generates a signal and transmits the signal to an external terminal through the communication interface of the PCB board 15, wherein the inertial flywheel 11 rotates every circle, the magnet 17 coincides with the magnetic sensing element 16 once, and the external terminal calculates the time interval between the two signals by a calculation module, thereby calculating an rotation speed of the flywheel.

The external terminal includes a terminal device having a calculation module such as a PC, a microcontroller, and the like.

An exercise equipment provided according to the present invention includes the above-mentioned flywheel assembly 300 having a speed measuring device.

Figure 3:
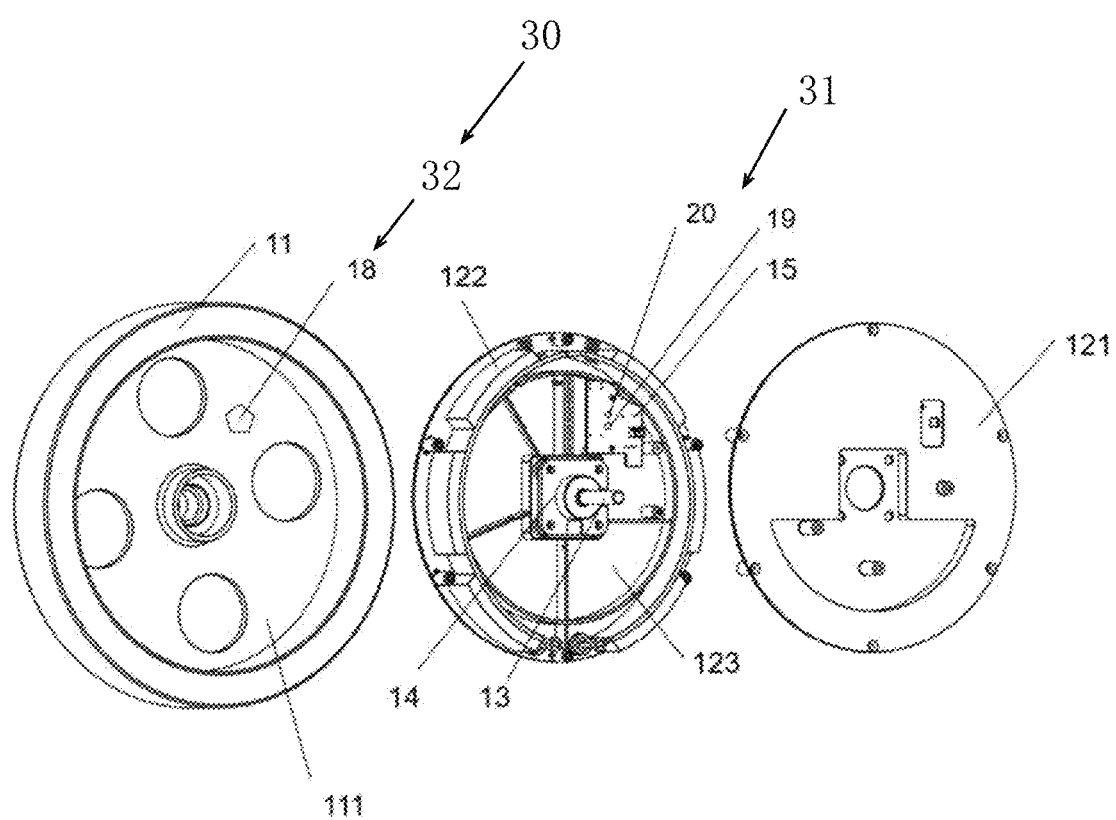
FIG. 3 is a perspective schematic diagram of a modification of the flywheel assembly according to the above preferred embodiment of the present invention.

Modifications are shown in FIGS. 1 and 3, wherein the acting member 32 is an infrared reflecting area 18, the infrared reflecting area 18 is located at the middle of the radius of the bottom wall of the installation chamber 111, wherein no area on the inertial flywheel 11 other than the infrared reflecting area 18 is capable of reflecting infrared rays. The sensing element 31 comprises an infrared emitting tube 19 and an infrared receiving tube 20, both the infrared emitting tube 19 and the infrared receiving tube 20 are mounted on the PCB 15, and both the infrared emitting tube 19 and the infrared receiving tube 20 are electrically connected with the PCB 15 by a circuitry thereof. The infrared emitting tube 19 and the infrared receiving tube 20 are both positioned opposite the infrared reflecting area 18 and the infrared emitting tube 19 and the infrared receiving tube 20 are both located at a rotation path of the infrared reflecting area 18.

When the inertial flywheel 11 rotates relative to the magnetic control disk 12, the infrared reflecting area 18 rotates around an axis of the central axis 13 following the inertial flywheel 11, and when the infrared reflecting area 18 coincides with the infrared emitting tube 19 and the infrared receiving tube 20, the infrared reflecting area 18 can reflect an infrared ray emitted by the infrared emitting tube 19 to the infrared receiving tube 20. When the infrared receiving tube 20 receives the infrared ray, it can generate a signal, and the signal is transmitted to an external terminal through a communication interface of the PCB 15, wherein the inertial flywheel 11 rotates one revolution, the infrared receiving tube 20 generates a signal once, and the external terminal calculates a time interval between the two signals by a calculation module to calculate the rotation speed.

In operation, the staff adjusts the magnitude of magnetic resistance by adjusting the gap between the magnetic ring 123 and the sidewall of the installation chamber 111; when the inertial flywheel 11 rotates relative to the magnetic control disk 12, the acting member 32 rotates along with the inertial flywheel 11, and when the position of the acting member 32 is aligned with the position of the sensing element 31, the sensing element 31 generates a sensing signal, the sensing signal is transmitted to an external terminal through a communication interface on the PCB 15, and the external terminal calculates the time interval between the two signals by a calculation module, thereby calculating the rotation speed of the inertial flywheel 11.

Figure 4:
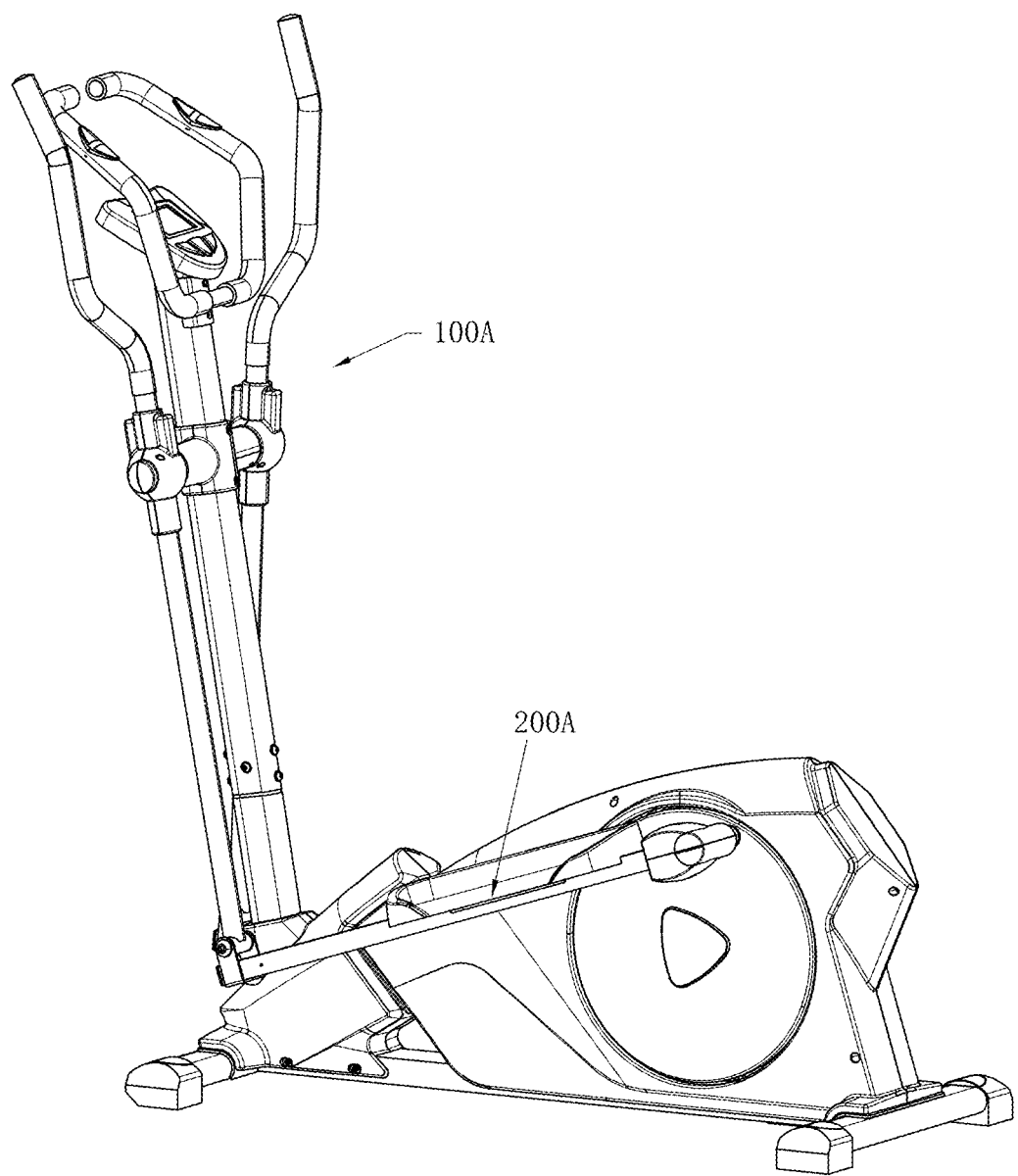
FIG. 4 is a perspective schematic diagram of a fitness equipment according to according to the above preferred embodiment of the present invention.
Figure 5A:
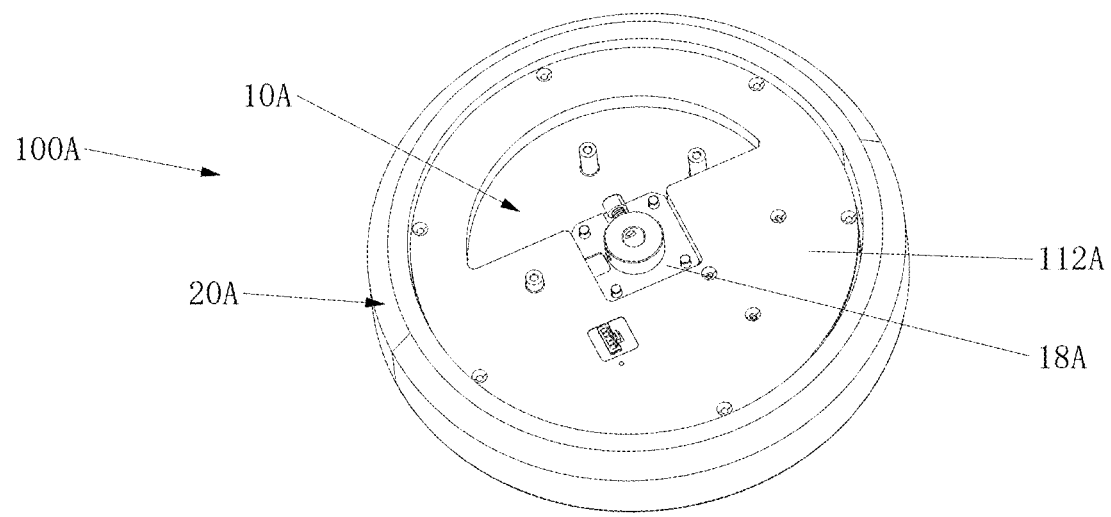
FIG. 5A is another perspective schematic diagram of the flywheel assembly according to according to the above preferred embodiment of the present invention.
Figure 5B:
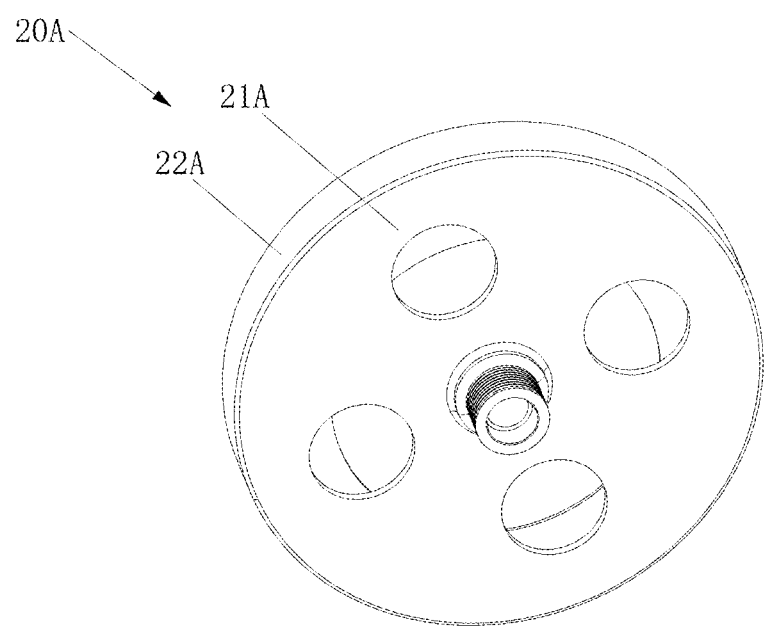
FIG. 5B is another perspective schematic diagram of the flywheel assembly according to according to the above preferred embodiment of the present invention.
Figure 6A:
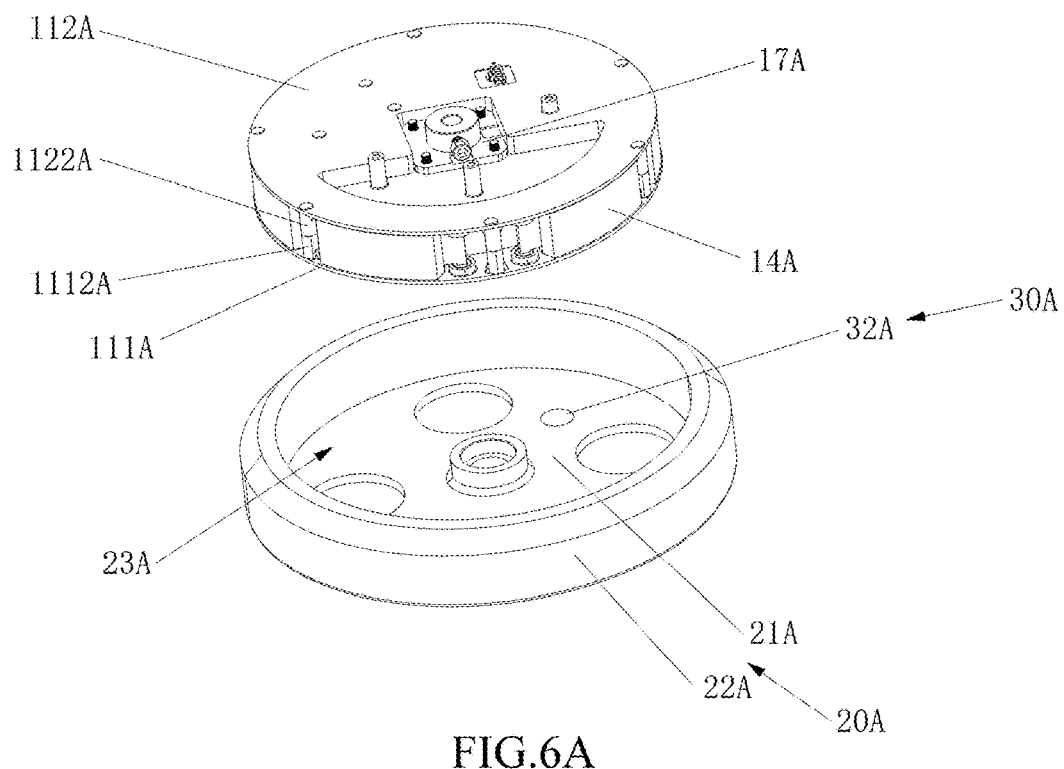
FIG. 6A is an exploded schematic diagram of the flywheel assembly according to the above preferred embodiment of the present invention.
Figure 6B:
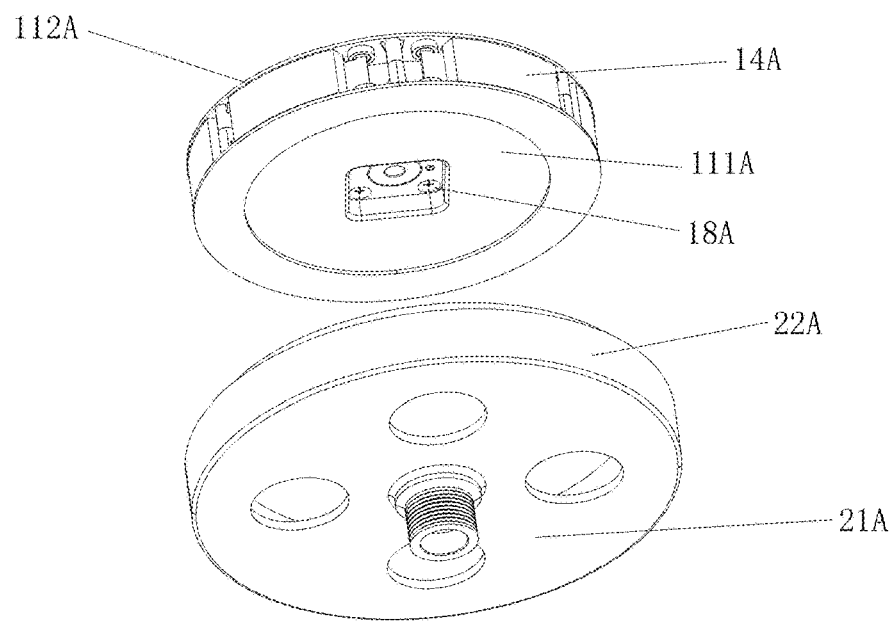
FIG. 6B is another exploded schematic diagram of the flywheel assembly according to the above preferred embodiment of the present invention.
Figure 7:
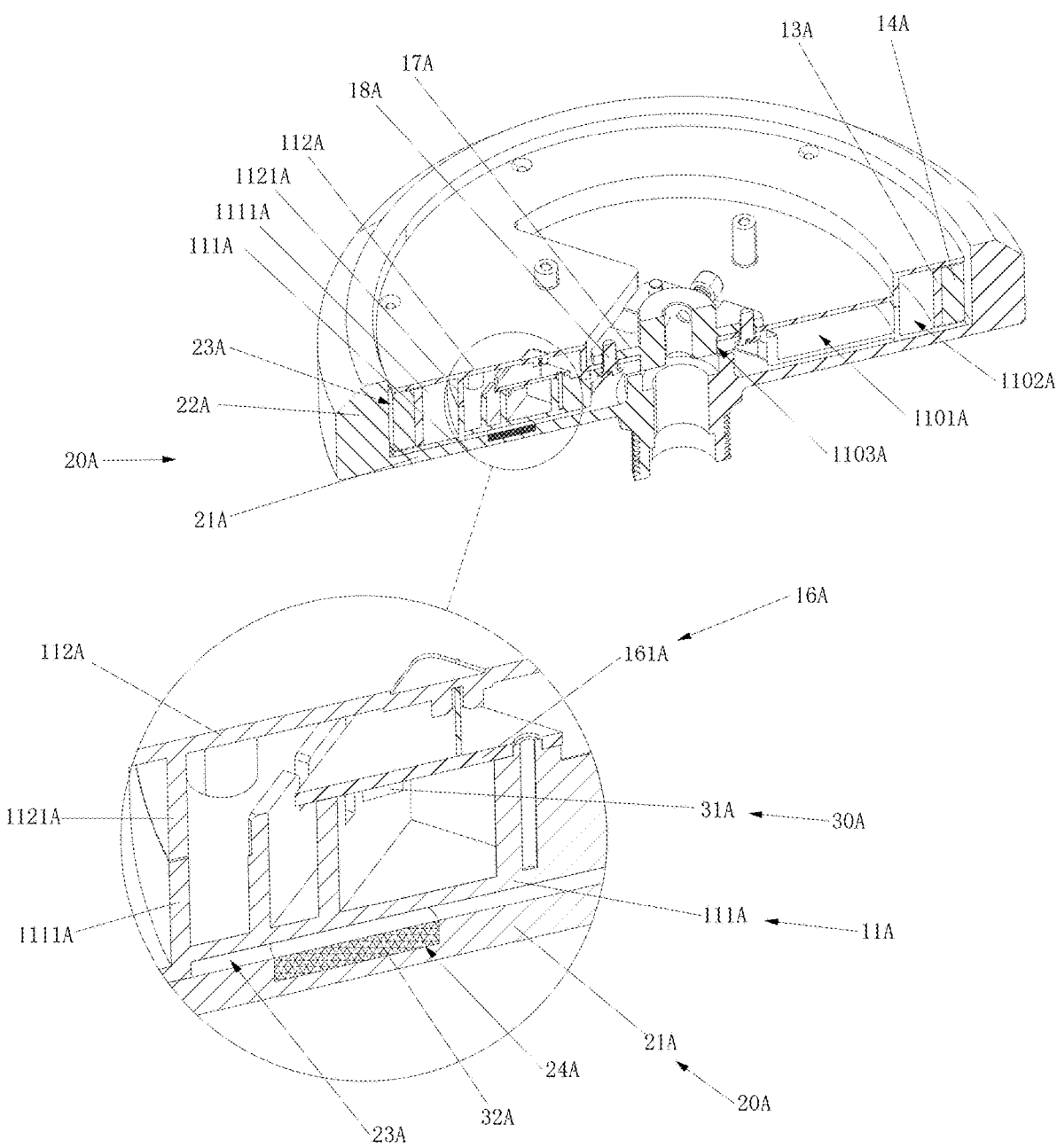
FIG. 7 is a sectional schematic diagram of the flywheel assembly according to the above preferred embodiment of the present invention.
Figure 8A:
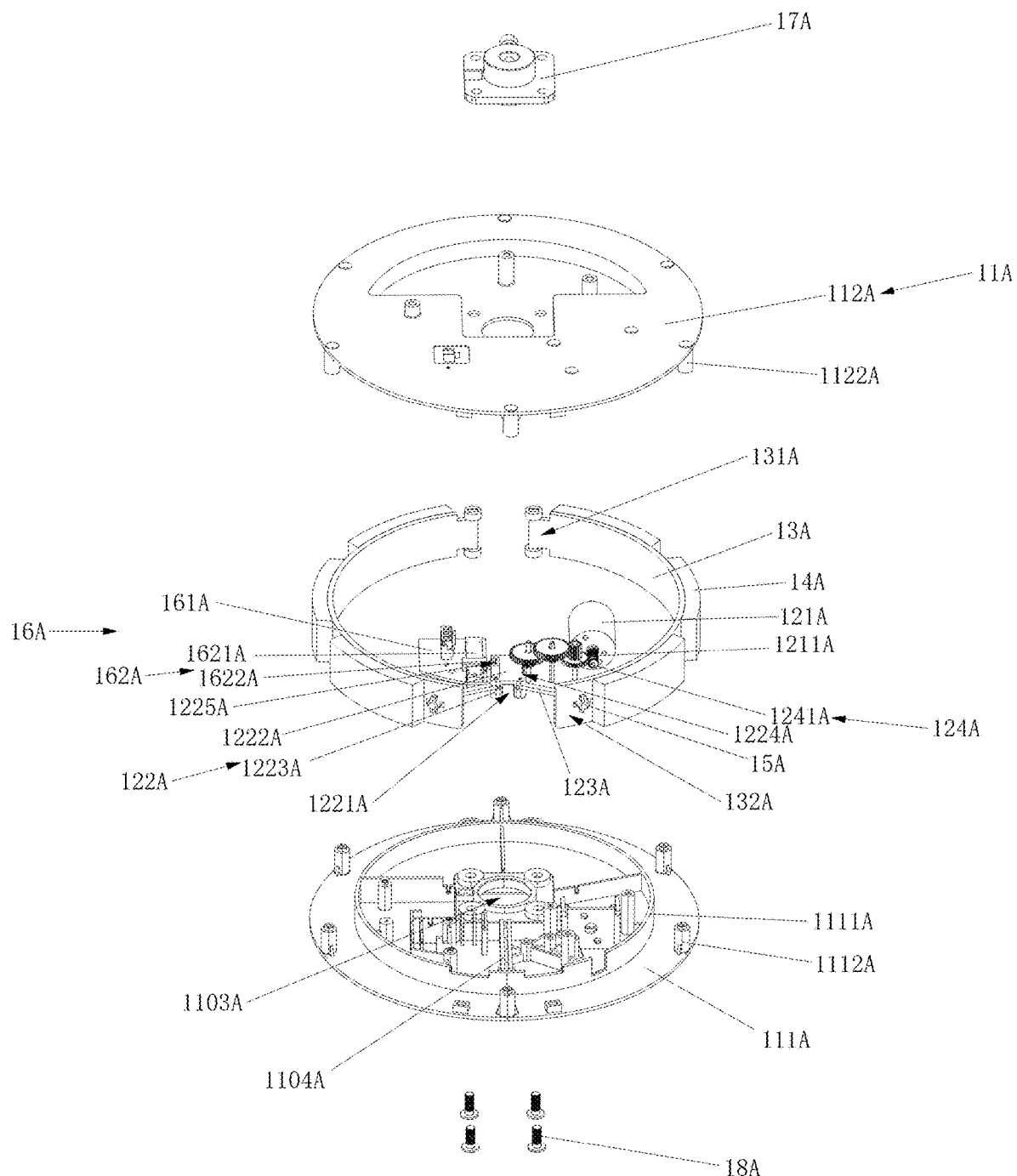
FIG. 8A is an exploded schematic diagram of an internal magnetic control device of the flywheel assembly according to the above preferred embodiment of the present invention.
Figure 8B:
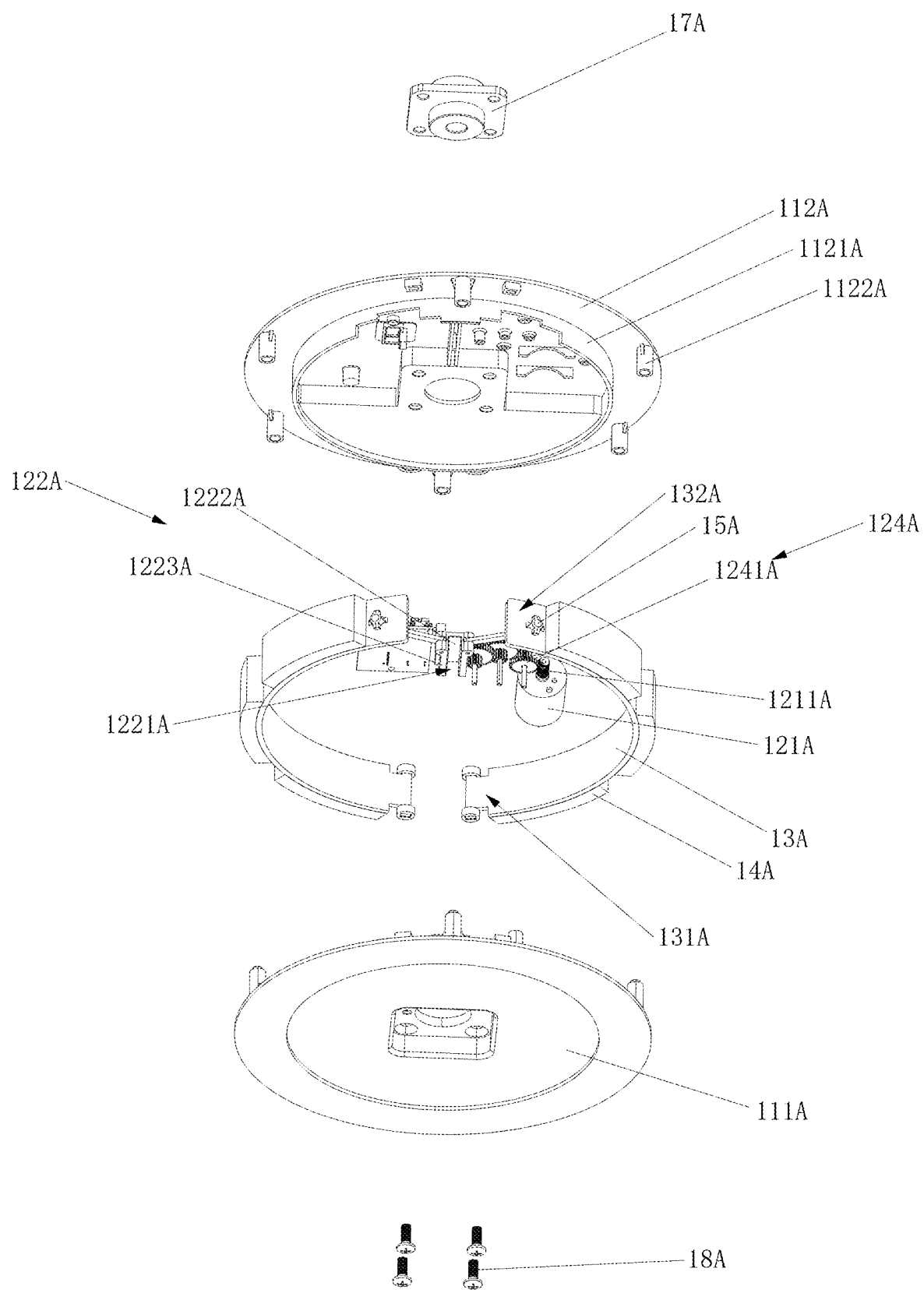
FIG. 8B is another exploded schematic diagram of the internal magnetic control device of the flywheel assembly according to the above preferred embodiment of the present invention.
Figure 9:
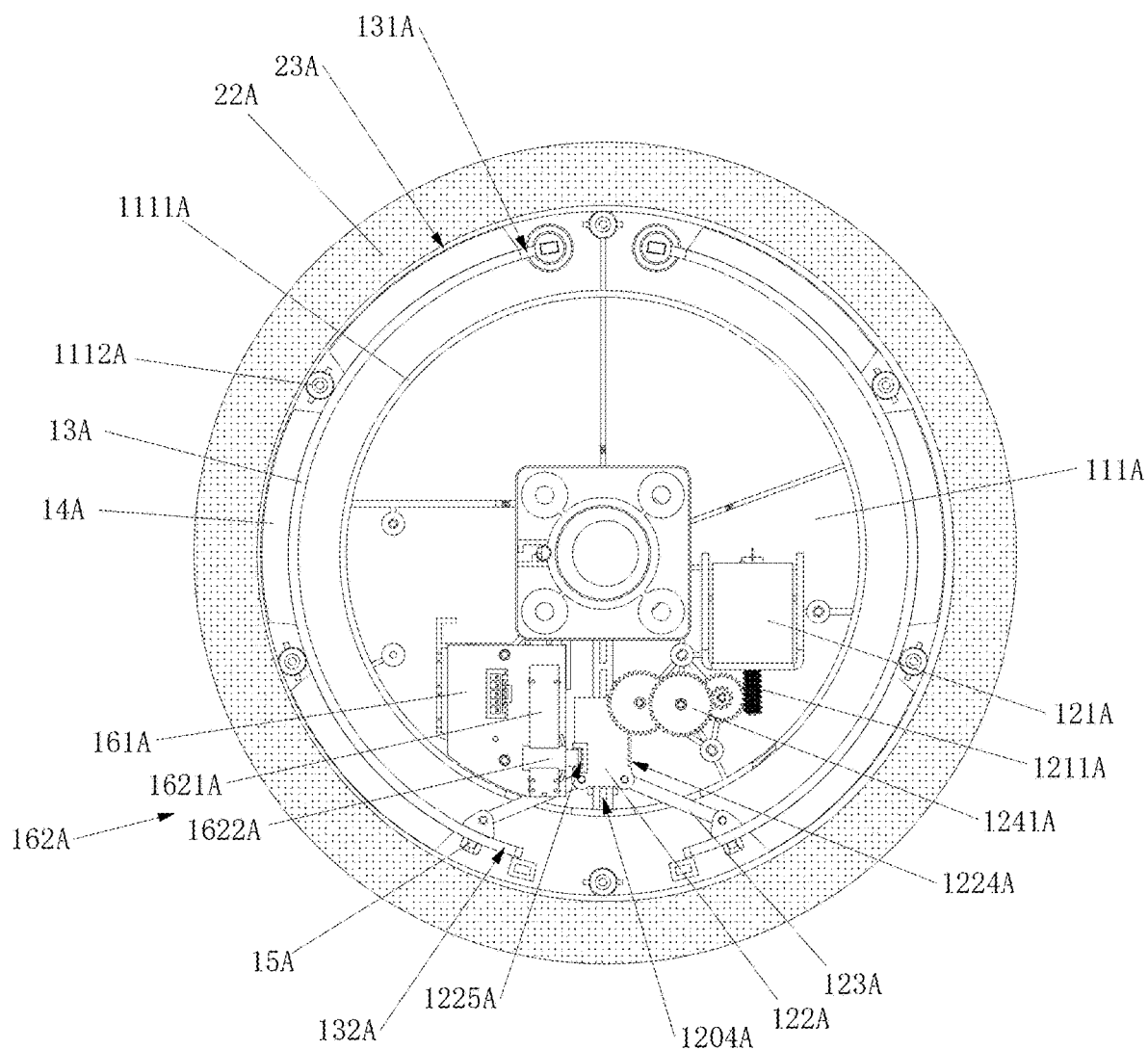
FIG. 9 is a top schematic diagram of a local structure of the flywheel assembly according to the above preferred embodiment of the present invention.
Figure 10A:
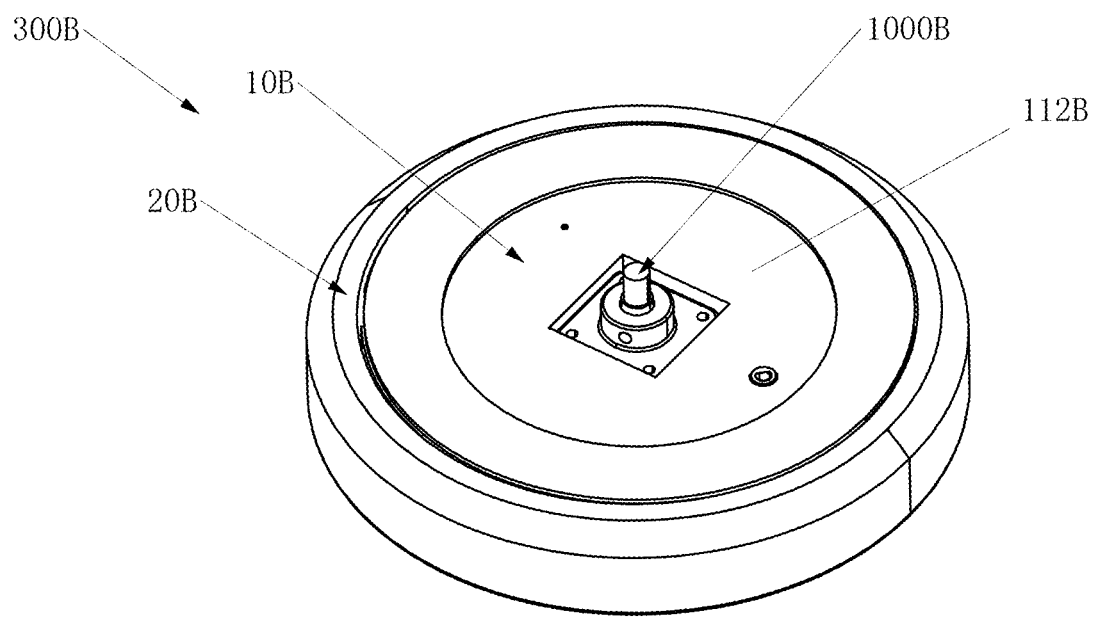
FIG. 10A is another perspective schematic diagram of the flywheel assembly according to according to another preferred embodiment of the present invention.
Figure 10B:
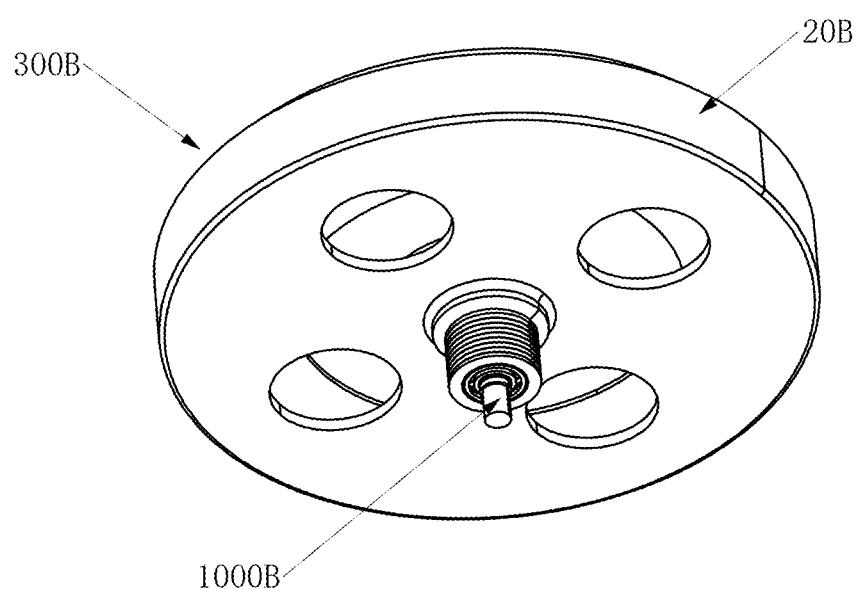
FIG. 10B is another perspective schematic diagram of the flywheel assembly according to according to the above another preferred embodiment of the present invention.
Figure 11A:
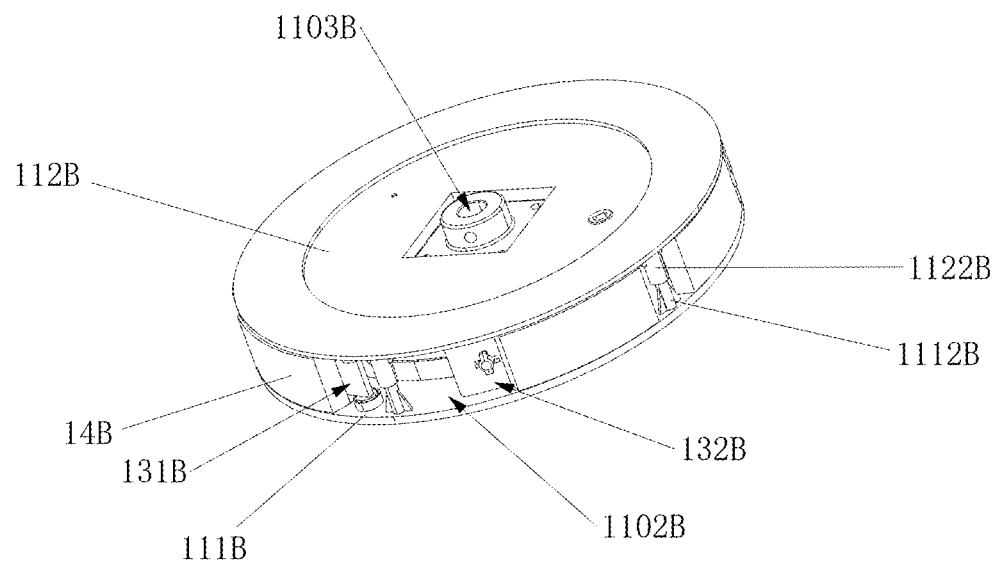
FIG. 11A is a perspective schematic diagram of an internal magnetic control device of the flywheel assembly according to the above another preferred embodiment of the present invention.
Figure 11B:
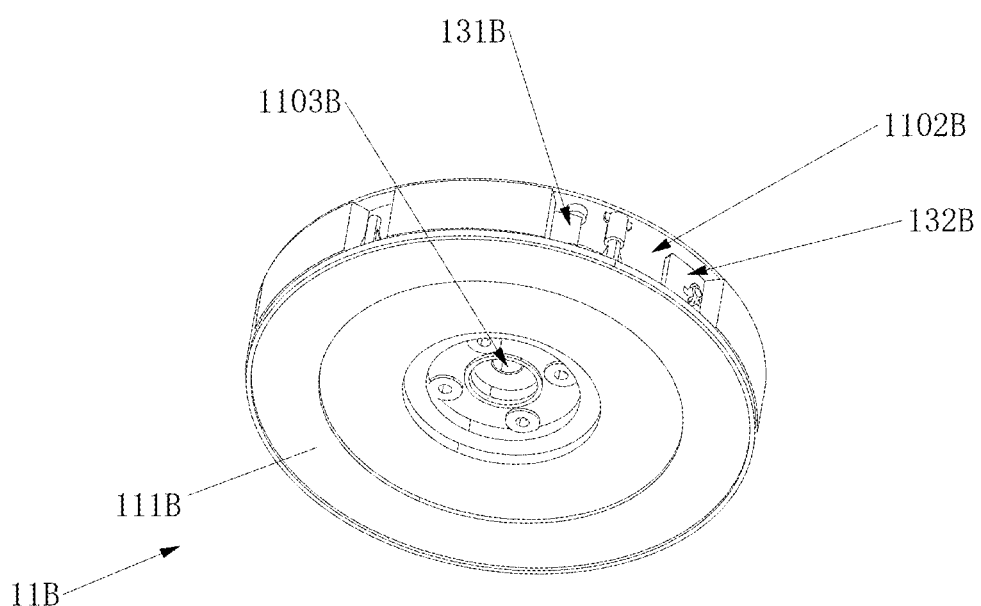
FIG. 11B is another perspective schematic diagram of the internal magnetic control device of the flywheel assembly according to the above another preferred embodiment of the present invention.
Figure 12A:
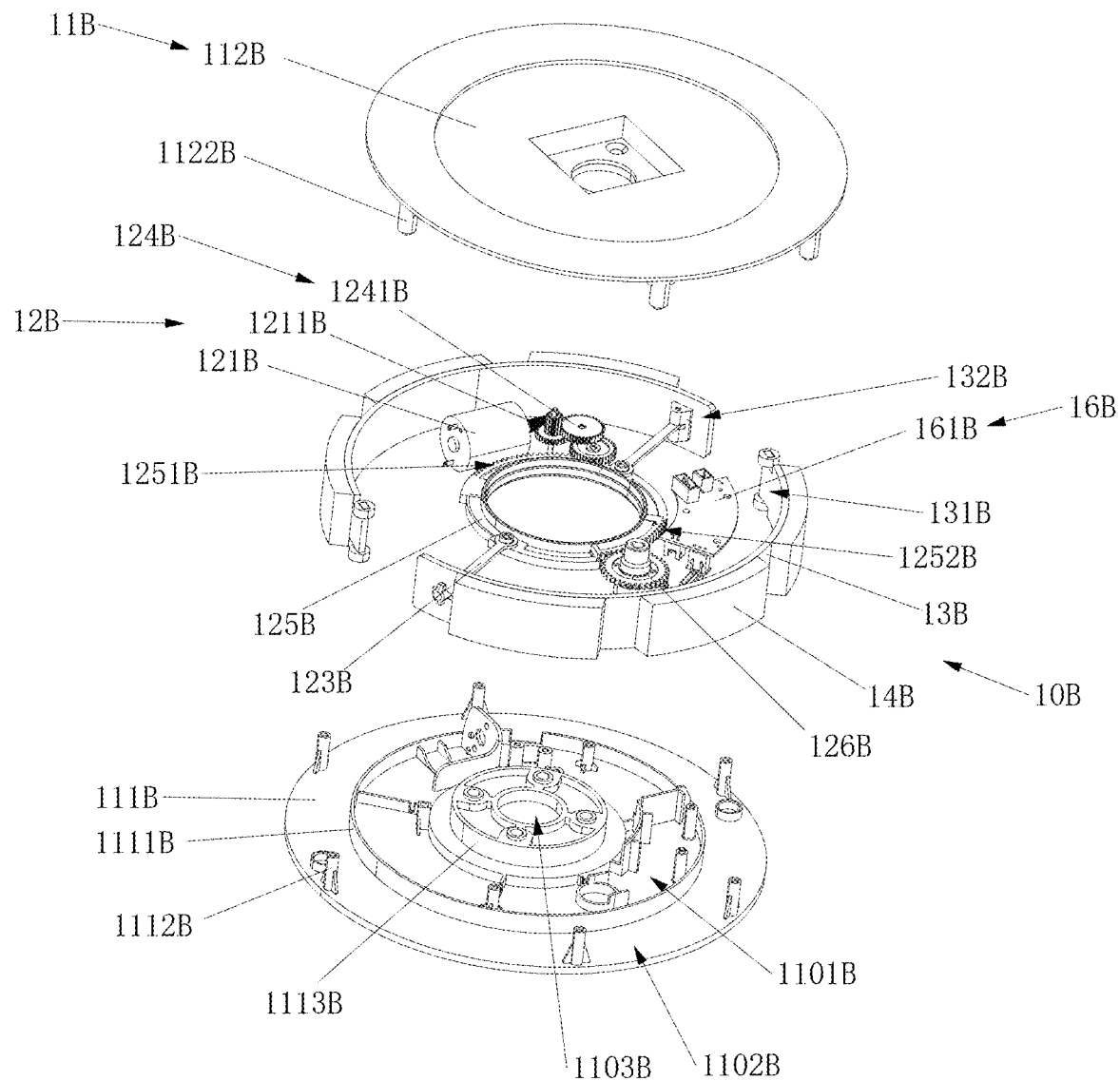
FIG. 12A is another exploded schematic diagram of the internal magnetic control device of the flywheel assembly according to the above preferred embodiment of the present invention.
Figure 12B:
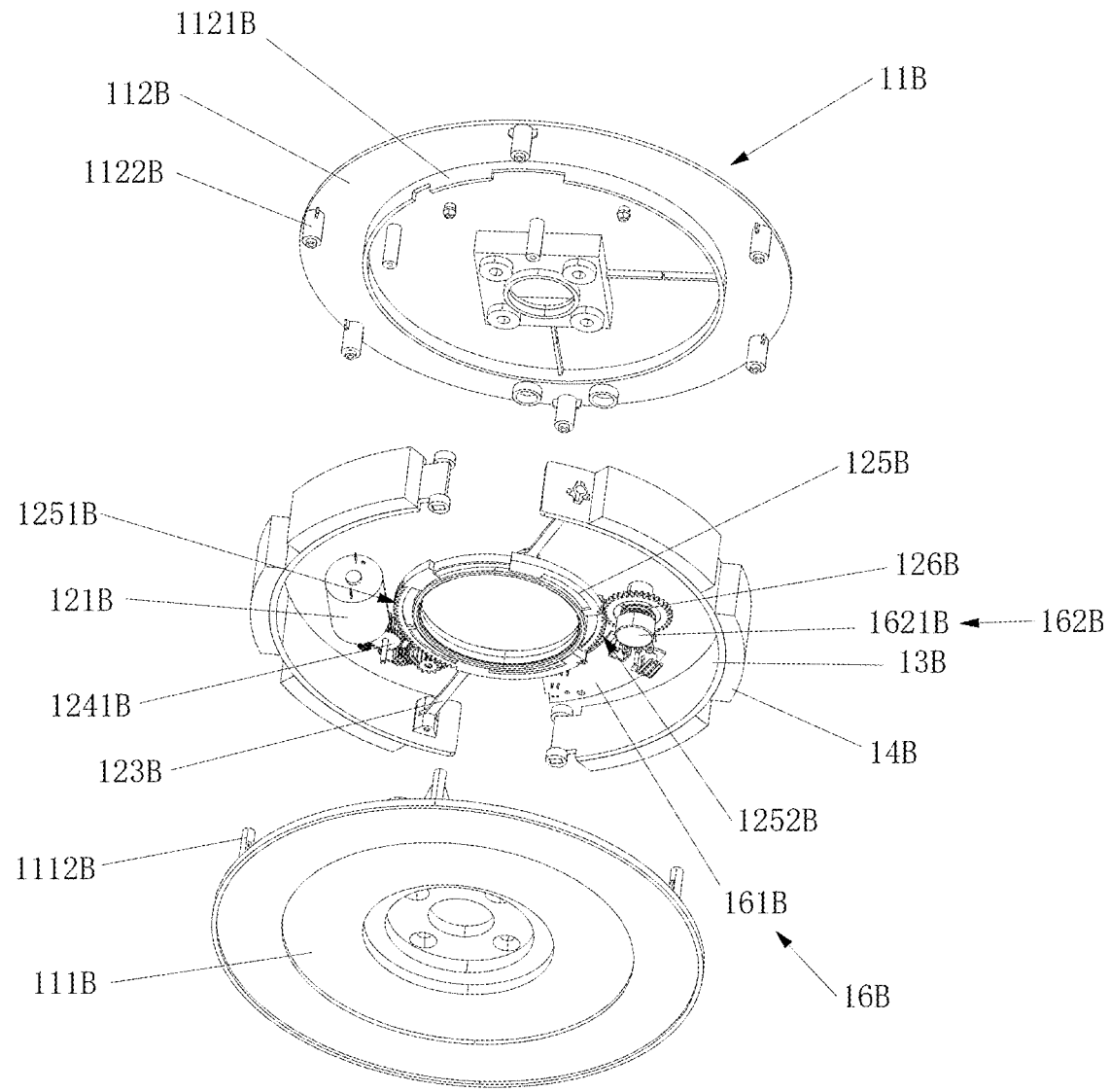
FIG. 12B is another exploded schematic diagram of the internal magnetic control device of the flywheel assembly according to the above another preferred embodiment of the present invention.

FIG. 4 shows a fitness equipment according to a preferred embodiment of the present invention, wherein the fitness equipment comprises an equipment rack 100A, a pedaling assembly 200A, and a flywheel assembly 300A, wherein the pedal assembly 200A is pedalably mounted on the equipment rack 100A, wherein the flywheel assembly 300A comprises an internal magnetic control device 10A and a flywheel 20A, wherein the internal magnetic control device 10A is fixedly mounted at the equipment rack 100A, and the flywheel 20A surrounds the internal magnetic control device 10A and is drivably connected to the pedaling assembly 200A. When a user continually pedals the pedaling assembly 200A and actuates the flywheel 20A to rotate relative to the equipment rack 100A and the internal magnetic control device 10A, the flywheel 20A continually cuts through the magnetic lines of inductance provided by the internal magnetic control device 10A to obtain a load, so that the user can achieve the purpose of fitness through the fitness equipment.

It is worth mentioning that the fitness equipment implemented as an elliptical machine illustrated in the attached FIG. 4 is only exemplary and it does not limit the specific type of the fitness equipment of the present invention. For example, in other exemplary embodiments of the present invention, the fitness equipment may also be a rowing machine, a dynamic bicycle, etc.

It will be appreciated that the load obtained by the flywheel 20A when the flywheel 20A is driven to rotate related to the amount by which the flywheel 20A cuts through the magnetic inductance of the inner magnetron 10A. Specifically, the more the flywheel 20A cuts through the magnetic lines of inductance of the internal magnetic control device 10A while being driven to rotate, the greater the load that the flywheel 20A can obtain, at the same time, the user need to struggle to step on the pedal assembly 200A, more greatly. Correspondingly, the less the amount of the flywheel 20A that cuts through the magnetic lines of inductance of the internal magnetic control device 10A while being driven to rotate, the smaller the load that the flywheel 20A is able to obtain, at which point the user uses less effort when pedaling the pedaling assembly 200A.

It is worth mentioning that the load obtained by the flywheel 20A when the flywheel 20A is driven to rotate is reflected in the resistance value of the user when stepping on the pedaling assembly 20, the greater the load obtained by the flywheel 20A when it is driven to rotate, the greater the resistance value of the user when stepping on the pedaling assembly 200A, and accordingly the smaller the load obtained by the flywheel 20A when it is driven to rotate, the more effortless the user can exert when the smaller the resistance value when stepping on the pedal assembly 200A.

In order to satisfy the different needs of the user for the load of the flywheel 20A of the fitness equipment, the internal magnetic control device 10A of the present invention is provided to be capable of adjusting the relative position of the magnetic inductance lines and the flywheel 20A, such that the closer the magnetic inductance lines of the internal magnetic control device 10A is to the flywheel 20A, the more the amount of the flywheel 20A cuts through the greater the amount of magnetic inductance lines of the inner magnetron 10A while being driven to rotate by the internal magnetic control device 10A, and accordingly, the further away from the flywheel 20A the magnetic inductance lines of the internal magnetic control device 10A is positioned, the less the amount of magnetic inductance lines which the flywheel 20A cuts through while being driven to rotate. Thus, the resistance value of a user when stepping on the pedaling assembly 200A can be adjusted by adjusting the relative positions between the magnetic inductance lines of the internal magnetic control device 10A and the flywheel 20A.

Specifically, refer to FIGS. 5A to 9, the internal magnetic control device 10A comprises a housing unit 11A, a driving unit 12A, two swing arm 13A, and two sets of magnetic elements 14A. The housing unit 11A has a housing space 1101A and a periphery opening 1102A communicated with the housing space 1101A. The driving unit 12A is provided in the housing space 1101A of the housing unit 11A to provide a driving force. Each swing arm 13A has a pivoting end to 131A and a driven end 132A corresponding to the pivoting end 131A, wherein the housing unit 11A, the driven end 132A of each of the two swing arms 13A, which can be driven by the driving unit 12A, respectively, and the two swing arm 13A are kept in the periphery opening 1102A of the housing unit 11A mirror symmetrically. Each set of magnetic elements 14A is provided in each swing arm 13A, respectively, to allow each set to provide a magnetic field environment in the periphery opening 1102A of the housing unit 11A. The flywheel 20A surrounds the housing unit 11A of the internal magnetic control device 10A, and the periphery opening 1102A of the housing unit 11A corresponds to an inner side of the flywheel 20A, so that when the flywheel 20A is driven to rotate relative to the internal magnetic control device 10A, the flywheel 20A can cut the magnetic induction line of the magnetic elements 14A of each set of the internal magnetic control device 10A to obtain the load.

Preferably, an outer side of each swing arm 13A faces the periphery opening 1102A of the housing unit 11A, and each set of magnetic elements 14A is provided at the outer side of each swing arm 13A, so that each set of magnetic element 14A can be directly exposed to the periphery opening 1102A of the housing unit 11A.

It is worth mentioning that the way the magnetic element 14A is provided in each swing arm 13A is not limited in the flywheel assembly 300A of the present invention. For example, in a preferred example of the flywheel assembly 300A of the present invention, each set of magnetic elements 14A can be provided to each swing arm 13A by glue bonding. Alternatively, in other examples of the flywheel assembly 300A of the present invention, each set of magnetic elements 14A can be provided in each swing arm 13A by being embedded.

It is worth mentioning that the amount of the magnetic element 14A of each set of magnetic elements 14A is not limited in the flywheel assembly 300A of the present invention. For example, in a preferred example of the flywheel assembly 300A, which is shown in FIGS. 5A to 9, each set of magnetic elements 14A has three magnetic elements 14A, which are provided at an outer side of the swing arm 13A at intervals.

Preferably, the swing arm 13A is curved between the pivoting end 131A and the driven end 132A such that swing arm 13A has an arc shape, so the outer side of the swing arm 13A has a shape the same as the shape of the periphery of the housing unit 10, substantially. Preferably, a set of magnetic elements 14A are curved and the inner side of the set of the magnetic elements 14A has a shape the same as the shape of the outer side of the swing arm 13A, so as to facilitate reliable setting of the set of the magnetic elements 14A on the outer side of the swing arm 13A.

With continued reference to FIGS. 5A to 9 of the accompanying drawings, the housing unit 11A further comprises a disk-shaped first housing 111A and a disk-shaped second housing 112A, wherein the first housing 111A has a first ring body 1111A, the second housing 112A has a second ring body 1121A, wherein the first housing 111A and the second housing 112A are mounted to each other to enable the first ring body 1111A and the second ring body 1121A to be corresponded to each other, so that an inner side of the first ring body 1111A and an inner side of the second housing 112A define the housing space 1101A therebetween and the periphery opening 1102A is defined on an outer side of the first ring body 1111A and an outer side of the second housing 112A.

Further, a plurality of first mounting pillars 1112A are provided at an edge of the first housing 111A, a plurality of second mounting pillars 1122A are provided on an edge of the second housing 112A, and each of the first mounting pillars 1112A of the first housing 111A and each of the second mounting pillars 1122A of the second housing 112A, respectively, are mounted and supported against each other to avoid deformation of the edge of the first housing 111A and the edge of the second housing 112A. Preferably, screws are provided to allow to be mounted to the first mounting pillars 1112A of the first housing 111A and the second mounting pillars 1122A of the second housing 112A to lock the first housing 111A and the second housing 112A at the edge of the first housing 111A and the edge of the second housing 112A.

Two opposite sides of each of the pivoting ends 131A of the swing arm 13A are rotatably mounted at the edge of the first housing 111A and at the edge of the second housing 112A, respectively, to pivotally mount the pivoting ends 131A of the swing arm 30 at an edge of the housing unit 11A and the swing arm 13A is provided to allow to swing in the periphery opening 1102A of the housing unit 11A to swing, and the first mounting pillars 1112A of the first housing 111A and the second mounting pillars 1122A of the second housing 112A are provided at an outside of the swing arm 13A to limit an outward swing magnitude of the swing arm 13A.

Preferably, the first mounting pillars 1112A of the first housing 111A and the second mounting pillars 1122A of the second housing 112A correspond to gaps between two adjacent the magnetic elements 14A of a set of the magnetic elements 14A to keep clear of the magnetic elements 14A, such that the swing arm 13A is able to drive the set of the magnetic elements 14A to have a greater swing amplitude, so as to enable the load of the flywheel 20A to be adjusted over a greater range.

The housing unit 11A further has a center hole 1103A, the housing space 1101A is disposed around the center hole 1103A, and the housing space 1101A and the center hole 1103A are separated from each other, wherein a mounting shaft of the equipment rack 100A can be mounted in the center hole 1103A of the housing unit 11A, so as to securely mount the internal magnetic control device 10A 14A at the equipment rack 100A. When a user continually pedals the pedaling assembly 200A of the fitness equipment to drive the flywheel 20A of the flywheel assembly 300A with respect to the internal magnetic control device 10A, the flywheel 20A is capable of cutting the magnetic induction line of each of the sets of the magnetic elements 14A of the internal magnetic control device 10A and thereby obtaining a load, so that the user can achieve fitness through the fitness equipment.

When the driving unit 12A drives each of the swinging arms 13A to swing relative to the housing unit 11A, each of the swinging arms 13A is able to drive each set of the magnetic elements 14A to swing synchronously to change a relative distance between each set of the magnetic elements 14A and the flywheel 20A, so as to regulate the relative distance between the magnetic inductance lines of the internal magnetic control device 10A and the flywheel 20A so as to adjust the relative distance between the magnetic inductance lines of the internal magnetic control device 10A and the flywheel 20A, thereby adjusting the load obtained by the flywheel 20A while being driven to rotate, and thus the resistance value of the user when stepping on the pedaling assembly 200A can be adjusted.

Specifically, the relative distance between each set of the magnetic elements 14A and the flywheel 20A is adjusted to a design minimum when the driving unit 12A drives each of the swing arms 13A to swing outwardly to a maximum swing position, whereby the flywheel 20A cuts through a greatest amount magnetic inductance lines of each set of the magnetic elements 14A when being driven to rotate, and whereby the flywheel 20A is capable of obtaining a greatest resistance. Specifically, the relative distance between each set of the magnetic elements 14A and the flywheel 20A is adjusted to a design maximum when the driving unit 12A drives each of the swing arms 13A to swing inwardly to a minimum swing position, whereby the flywheel 20A cuts through a smallest amount magnetic inductance lines of each set of the magnetic elements 14A when being driven to rotate, and whereby the flywheel 20A is capable of obtaining a smallest resistance.

It is understood that in the course of the driving unit 12A driving each of the swing arms 13A to swing from the minimum swinging position to the maximum swinging position, respectively, the amount of the magnetic inductance lines of each set of the magnetic elements 14A cut by the flywheel 20A while being driven to rotate is gradually increased, so that the resistance obtained by the flywheel 20A while being driven to rotate is gradually increased. Correspondingly, in the course of the driving unit 12A driving each of the swing arms 13A to swing from the maximum swing position to the minimum swing position, respectively, the amount of the flywheel 20A that cuts through the magnetic inductance lines of each set of the magnetic elements 14A while being driven to rotate gradually decreases, so that the resistance obtained by the flywheel 20A while being driven to rotate gradually decreases.

With continued reference to FIGS. 5A to 9 of the accompanying drawings, the driving unit 12A of the internal magnetic control device 10A further comprises a driving motor 121A, a slider 122A, and two connecting arms 123A. The driving motor 121A is mounted in the housing space 1101A of the housing unit 11A. The housing unit 11A has a track 1104A, which is extended from the periphery opening 1102A of the housing unit 11A to the center hole 1103A, wherein the slider 122A is slidably disposed on the track 1104A of the housing unit 11A and the slider 122A is drivably connected with an output shaft 1211A of the driving motor 121A. One end of each of the connecting arms 123A is rotatably mounted to each of two opposite sides of the slider 122A, and another end of each the connecting arm 123A is rotatably mounted to the driven end 132A of each of the swing arms 13A. When the driving motor 121A drives the slider 122A to slide along the track 1104A of the housing unit 11A, the slider 122A drives each of the swing arms 13A to swing through each of the connecting arms 123A, respectively, so as to regulate the relative distance between the magnetic inductance lines of the internal magnetic control device 10A and the flywheel 20A.

Specifically, when the driving motor 121A drives the slider 122A to slide outwardly along the track 1104A of the housing unit 11A, the slider 122A drives each of the swing arms 13A to swing outwardly through each of the connecting arms 123A to allow each of the swing arms 13A to be able to swing from the minimum swing position to the maximum swing position. Correspondingly, when the driving motor 121A drives the slider 122A to slide inwardly along the track 1104A of the housing unit 11A, the slider 122A drives each of the swing arms 13A to swing inwardly through each of the connecting arms 123A to allow each of the swing arms 13A to be able to swing from the maximum swing position to the minimum swing position.

In this specific example of the flywheel assembly 300A, which is illustrated in FIGS. 5A to 9 of the accompanying drawings, the driving motor 121A of the driving unit 12A is fixedly mounted to the first housing 111A of the housing unit 11A. The track 1104A of the housing unit 11A is a strip track integrally formed in the first housing 111A and extended from an edge of the first housing 111A to a center of the first housing 111A, such that the track 1104A are extended from the periphery opening 1102A of the housing unit 11A to the center hole 1103A, wherein the slider 122A is provided to ride on the track 1104A of the housing unit 11A, such that when the driving motor 121A drives the slider 122A to slide along the track 1104A of the housing unit 11A, it is possible to avoid the slider 122A from disengaging from the track 1104A of the housing unit 11A.

Specifically, the slider 122A has a sliding groove 1221A for accommodating the track 1104A of the housing unit 11A therein such that the slider 122A is able to ride on the track 1104A of the housing unit 11A. More specifically, the slider 122A comprises a slider body 1222A and two slider arms 1223A, the two slider arms 1223A is extended integrally and downwardly from two opposite sides of the slider body 1222A, respectively, to form the sliding groove 1221A between the slider body 1222A and each of the slider arms 1223A, wherein when the slider 122A is provided to ride on the track 1104A of the housing unit 11A, the slider body 1222A rides on a top of the track 1104A, the two slider arms 1223A are disposed on two opposite sides of the track 1104A, respectively, such that the track 1104A is accommodated in the slide groove 1221A of the slider 122A such that when the driving motor 121A drives the slider 122A to slide along the track 1104A of the housing unit 11A, it is possible to prevent the slider 122A from disengaging from the track 1104A of the housing unit 11A.

Alternatively, in other examples of the flywheel assembly 300A of the present invention, the strip-shaped track 1104A of the housing unit 11A may be integrally formed in the second housing 112A and extended from an edge of the second housing 112A to a center of the second housing 112A, such that the track 1104A is extended from the periphery opening 1102A of the housing unit 11A to the center hole 1103A.

Optionally, in other examples of the flywheel assembly 300A of the present invention, the track 1104A of the housing unit 11A is a groove which is formed by way of recessing of the first housing 111A and extended from the edge of the first housing 111A to the center of the first housing 111A or is formed by way of recessing of the second housing 112A and extended from the edge of the second housing 112A to the center of the second housing 112A, wherein the slider 122A is partially retained in the track 1104A of the housing unit 11A such that the slider 122A can be prevented from disengaging from the track 1104A of the housing unit 11A when the driving motor 121A drives the slider 122A to slide along the track 1104A of the housing unit 11A.

It is worth mentioning that the way the ends of the connecting arms 123A of the driving unit 12A are provided at the driven end 132A of each swing arm 13A is not limited in the flywheel assembly 300A of the present invention. For example, the internal magnetic control device 10A further includes two assembling bodies of 15A, wherein the connecting arms 123A of the driving unit 12A is rotatably installed in the assembling bodies of 15A, and the assembling bodies of 15A are installed at the driven end 132A of each swing arm 13A, respectively, so that the end of the connecting arm 123A can be installed at the driven end 132A of each swing arm 13A.

Further, With continued reference to FIGS. 5A to 9 of the accompanying drawings, the driving unit 12A further includes a transmission gear assembly 124A, which is used to transmit a power output by the output shaft 1211A of the driving motor 121A to the slider 122A to drive the slider 122A to slide along the track 1104A, inwardly or outwardly, so as to drive the swing arms 13A to swing inwardly or outwardly.

Specifically, the slider 122A has a column of slider teeth 1224A, which are arranged along the length direction of the slider 122A, wherein the transmission gear assembly 124A comprises a plurality of gears 1241A engaged with each other, wherein one gear 1241A of the plurality of gears 1241A is engaged with the output shaft 1211A of the driving motor 121A, another gear 1241A of the plurality of gears 1241A is engaged with the slider teeth 1224A of the slider 122A, so when the driving motor 121A outputs the power in the way of rotation of the output shaft 1211A of the driving motor 121A, the power can be passed to the slider 122A through the transmission gear assembly 124A to drive the slider 122A to slide along the track 1104A of the housing unit 11A inwardly or outwardly, so as to drive the swing arm 13A to swing inwardly or outwardly.

It is worth mentioning that the amount of the gears 1241A of the transmission gear assembly 124A is not limited in the flywheel assembly 300A of the present invention. For example, in the specific example of the flywheel assembly 300A shown in FIGS. 5A to 9, the transmission gear assembly 124A has three gears 1241A.

With continued reference to FIGS. 5A to 9 of the accompanying drawings, the internal magnetic control device 10A further includes a potential control unit 16A, wherein the potential control unit 16A includes a circuit board 161A, wherein the circuit board 161A is provided in the housing space 1101A of the housing unit 11A, the driving motor 121A of the driving unit 12A is connected to the circuit board 161A of the potential control unit 16A. Preferably, the circuit board 161A is fixedly installed in the first housing 111A of the housing unit 11A.

The potential control unit 16A further includes a sliding potentiometer 162A, which includes the a potentiometer body 1621A and a sliding arm 1622A provided at the potentiometer body 1621A slidably, wherein the potentiometer body 1621A is attached or welded on the circuit board 161A, the sliding arm 1622A is connected to the slider 122A. When the slider 122A is driven to slide along the track 1104A of the housing unit 11A inwardly or outwardly, the slider 122A drives the sliding arm 1622A of the sliding potentiometer 162A to slide with respect to the sliding potentiometer 162A to change the resistance value of the sliding potentiometer 162A. It can be understood that the resistance value of the sliding potentiometer 162A is related to the position the slider 122A is located at the track 1104A of the housing unit 11A, and the position the slider 122A is located at the track 1104A of the housing unit 11A determines the swing position of the swing arm 13A and the position of the magnetic elements 14A, and then determines the load of the flywheel 20A while being driven to rotate. In other words, the position of the internal magnetic control device 10A of the flywheel assembly 300A of the present invention and the position of the magnetic component 14A and the load of the flywheel 20A can be detected and determined by detecting the resistance value of the sliding potentiometer 162A when the flywheel 20A is drive to rotate.

It is worth mentioning that the way the sliding arm 1622A of the sliding potentiometer 162A is connected to the slider 122A is not limited in the flywheel assembly 300A of the present invention. For example, in the specific example of the flywheel assembly 300A shown in FIGS. 5A to 9, the slider 122A has a clamping slot 1225A, wherein the sliding arm 1622A of the sliding potentiometer 162A is clamped in the clamping slot 1225A, so that the sliding arm 1622A of the sliding potentiometer 162A is connected to the slider 122A.

Further, with continued reference to FIGS. 5A to 9 of the accompanying drawings, the internal magnetic control device 10A further includes a fixing flange 17A and a plurality of screws 18A, wherein the fixing flange 17A is fitted on the second housing 112A of the housing unit 11A, the plurality of screws 18A pass through the first housing 111A and the second housing 112A in sequence and are installed in the fixing flange 17A, so that the first housing 111A and the second housing 112A are locked by locking a center of the first housing 111A and a center of the second housing 112A.

Further, in the flywheel assembly 300A of the present invention, the rotation speed the flywheel 20A is driven to rotate with respect to the equipment rack 100A and the internal magnetic control device 10A can be calculated.

Specifically, referring to FIGS. 5A to 9 of the accompanying drawings, in the specific example of the flywheel assembly 300A of the present invention, the flywheel assembly 300A further includes a speed measuring device 30A, wherein the speed measuring device 30A comprises a sensing element 31A and an acting member 32A, wherein the sensing element 31A, can be, but not limited to a Hall element, which is attached to the circuit board 161A, and the acting member 32A can be, but not limited to a magnet, which is provided at the flywheel 20A, and the position of the acting member 32A and the position of the sensing element 31A can be aligned with each other to allow the sensor element 31A to sense the acting member 32A to generate a signal. For example, the sensing element 31A is located in the rotation path of the acting member 32A, so that when the flywheel 20A drives the acting member 32A to rotate, the position of the acting member 32A and the position of the sensing element 31A can be corresponded to each other to allow the sensing element 31A to generate the signal. In the follow-up, the time interval between two signals generated by the sensing element 31A can be used for calculating the rotation speed of the flywheel 20A. Compared to the existing rotation speed measuring method by measuring the pedaling assembly of the fitness equipment and calculating a rotation speed of the flywheel by measuring a speed ratio of the pedaling assembly and the flywheel, the rotation speed measuring method of the flywheel of the present invention which directly measures the rotation speed of the flywheel through the flywheel assembly 300A of the present invention has higher accuracy and sensitivity.

Alternatively, in other examples of the flywheel assembly 300A of the present invention, the sensing element 31A can be provided at the flywheel 20A, correspondingly, the acting member 32A can be provided at the internal magnetic control device 10A, for example, the acting member 32A can be provided at the housing unit 11A of the internal magnetic control device 10A, and the acting member 32A is located at the rotation path of the sensing element 31A, so that when the flywheel 20A drives the sensing element 31A to rotate, the position of the acting member 32A and the position of the sensing element 31A can be aligned with each other, so as to allow the sensing element 31A to sense the acting member 32A and generate a signal. In the follow-up, the time interval between two signals generated by the sensing element 31A can be used for calculating the rotation speed of the flywheel 20A.

More specifically, the flywheel 20A comprises a flywheel disc 21A, a flywheel ring 22A and a flywheel space 23A, wherein the flywheel ring 22A is integrally extended along a periphery of the flywheel disc 21A to define the flywheel space 23A between the flywheel disk 21A and the flywheel ring 22A, wherein the internal magnetic control device 10A is retained in the flywheel space 23A of the flywheel 20A, so that when the flywheel 20A is driven to rotate with respect to the internal magnetic control device 10A, the flywheel ring 22A can cut through the magnetic induction lines of the internal magnetic control device 10A to make the flywheel 20A obtain the load. The acting member 32A of the speed measuring device 30A is provided at a middle of the flywheel disc 21A of the flywheel 20A, in this way, on the one hand, the flywheel 20A can drive the acting member 32A to rotate simultaneously, and the time spent in one rotation of the flywheel 20A is the same as the time spent in one rotation of the magnetic 32, on the other hand, the sensing element 31A can be located at the rotation path of the acting member 32A to allow the position of the acting member 32A and the position of the sensing element 31A to be corresponded to each other.

It is worth mentioning that the way the acting member 32A is provided in the flywheel 20A is not limited in the flywheel assembly 300A of the present invention. For example, in the specific example of the flywheel assembly 300A shown in FIGS. 5A to 9, the flywheel 20A has an embedding groove 24A formed in the flywheel disc 21A, wherein the acting member 32A is embedded in the embedding groove 24A of the flywheel 20A, so the acting member 32A is provided in the flywheel 20A. Preferably, after the acting member 32A is embedded in the embedding groove 24A of the flywheel 20A, the surface of the acting member 32A does not protrude from the surface of the flywheel 20A.

Alternatively, in other examples of the flywheel assembly 300A of the present invention, the acting member 32A can be provided in the flywheel disc 21A of the flywheel 20A through an embedding injection molding process, or be affixed to the flywheel 20A of the flywheel disc 21A of the flywheel 20A.

Alternatively, in other examples of the flywheel assembly 300A of the present invention, the sensing element 31A of the speed measuring device 30A is attached on the circuit board 161A and includes an infrared emitting tube and an infrared receiving tube, the acting member 32A is an infrared reflecting area, which is provided on the flywheel disc 21A of the flywheel 20A, wherein the infrared reflecting area of the sensing element 31A can continue to reflect infrared rays to the flywheel disc 21A of the flywheel 20A, when the flywheel 20A is driven to rotate to a position where the acting member 32A is aligned with the sensing element 31A, the acting member 32A can reflect infrared rays, and the infrared receiving tube of the sensing element 31A can receive the infrared rays reflected by the acting member 32A to allow the sensing element 31A to generate signals. In the follow-up, the time interval between two signals generated by the sensing element 31A can be used for calculating the rotation speed of the flywheel 20A.

FIGS. 10A to 13B illustrate a flywheel assembly 300B of another preferred embodiment of the present invention, wherein the flywheel assembly 300B includes an internal magnetic control device 10B and a flying wheel 20B, wherein the flywheel 20B surrounds the internal magnetic control device 10B, when the flywheel 20B is driven to rotate with respect to the internal magnetic control device 10B, the flywheel 20B cuts through magnetic induction lines provided by the internal magnetic control device 10B to obtain a load.

It is worth mentioning that the load obtained by the flywheel 20B when the flywheel 20B is driven to rotate is related to the amount of the magnetic inductance lines which is cut through by the flywheel 20B. Specifically, the more the flywheel 20B cuts through the magnetic lines of inductance of the internal magnetic control device 10B while being driven to rotate, the greater the load that the flywheel 20B can obtain. Correspondingly, the less the amount of the flywheel 20B that cuts through the magnetic lines of inductance of the internal magnetic control device 10B while being driven to rotate, the smaller the load that the flywheel 20B is able to obtain, at which point the user uses less effort when pedaling the pedaling assembly 200B. The internal magnetic control device 10B of the present invention is provided to be capable of adjusting the relative position of the magnetic inductance lines and the flywheel 20B, such that the closer the magnetic inductance lines of the internal magnetic control device 10B is to the flywheel 20B, the more the amount of the flywheel 20B cuts through the greater the amount of magnetic inductance lines of the inner magnetron 10B while being driven to rotate by the internal magnetic control device 10B, and accordingly, the further away from the flywheel 20B the magnetic inductance lines of the internal magnetic control device 10B is positioned, the less the amount of magnetic inductance lines which the flywheel 20B cuts through while being driven to rotate.

Specifically, refer to FIGS. 10A to 13B, the internal magnetic control device 10B comprises a housing unit 11B, a driving unit 12B, two swing arm 13B, and two sets of magnetic elements 14B. The housing unit 11B has a housing space 1101B and a periphery opening 1102B communicated with the housing space 1101B. The driving unit 12B is provided in the housing space 1101B of the housing unit 11B to provide a driving force. Each swing arm 13B has a pivoting end to 131B and a driven end 132B corresponding to the pivoting end 131B, wherein the housing unit 11B, the driven end 132B of the swing arm 13B, which can be driven by the driving unit 12B, respectively, and the two swing arm 13B are kept in the periphery opening 1102B of the housing unit 11B and are mirror symmetry. Each set of magnetic elements 14B is provided in each swing arm 13B, respectively, to allow each set of magnetic elements 14B to provide a magnetic field environment in the periphery opening 1102B of the housing unit 11B. The flywheel 20B surrounds an outside of the housing unit 11B of the internal magnetic control device 10B, and the periphery opening 1102B of the housing unit 11B corresponds to an inner side of the flywheel 20B, so that when the flywheel 20B is driven to rotate relative to the internal magnetic control device 10B, the flywheel 20B can cut through the magnetic induction lines of the magnetic elements 14B of each set of the internal magnetic control device 10B to obtain the load.

Preferably, an outer side of each swing arm 13B faces the periphery opening 1102B of the housing unit 11B, and each set of magnetic elements 14B is provided at the outer side of each swing arm 13B, so that each set of magnetic element 14B can be directly exposed to the periphery opening 1102B of the housing unit 11B.

It is worth mentioning that the way the magnetic element 14B is provided in each swing arm 13B is not limited in the flywheel assembly 300B of the present invention. For example, in a preferred example of the flywheel assembly 300B of the present invention, each set of magnetic elements 14B can be provided to each swing arm 13B by glue bonding. Alternatively, in other examples of the flywheel assembly 300B of the present invention, each set of magnetic elements 14B can be provided in each swing arm 13B by being embedded.

It is worth mentioning that the amount of the magnetic element 14B of each set of magnetic elements 14B is not limited in the flywheel assembly 300B of the present invention. For example, in a preferred example of the flywheel assembly 300B, which is shown in FIGS. 10A to 13B, each set of magnetic elements 14B has three magnetic elements 14B, which are provided at an outer side of the swing arm 13B at intervals.

Preferably, the swing arm 13B is curved between the pivoting end 131B and the driven end 132B such that swing arm 13B has an arc shape, so the outer side of the swing arm 13B has a shape the same as the shape of the periphery of the housing unit 11B, substantially. Preferably, a set of magnetic elements 14B are curved and the inner side of the set of the magnetic elements 14B has a shape the same as the outer side of the swing arm 13B, so as to facilitate reliable setting of the set of the magnetic elements 14B on the outer side of the swing arm 13B.

With continued reference to FIGS. 10A to 13B of the accompanying drawings, the housing unit 11B further comprises a disk-shaped first housing 111B and a disk-shaped second housing 112B, wherein the first housing 111B has a first ring body 1111B, the second housing 112B has a second ring body 1121B, wherein the first housing 111B and the second housing 112B are mounted to each other to enable the first ring body 1111B and the second ring body 1121B to be corresponded to each other, so that an inner side of the first ring body 1111B and an inner side of the second housing 112B define the housing space 1101B therebetween and the periphery opening 1102B is defined on an outer side of the first ring body 1111B and an outer side of the second housing 112B.

Further, a plurality of first mounting pillars 1112B are provided at an edge of the first housing 111B, a plurality of second mounting pillars 1122B are provided on an edge of the second housing 112B, and each of the first mounting pillars 1112B of the first housing 111B and each of the second mounting pillars 1122B of the second housing 112B, respectively, are mounted and supported against each other to avoid deformation of the edge of the first housing 111B and the edge of the second housing 112B. Preferably, screws are provided to allow to be mounted to the first mounting pillars 1112B of the first housing 111B and the second mounting pillars 1122B of the second housing 112B to lock the first housing 111B and the second housing 112B at the edge of the first housing 111B and the edge of the second housing 112B.

Two opposite sides of each of the pivoting ends 131B of the swing arm 13B are rotatably mounted at the edge of the first housing 111B and at the edge of the second housing 112B, respectively, to pivotally mount the pivoting ends 131B of the swing arm 13B at an edge of the housing unit 11B and the swing arm 13B is provided to allow to swing in the periphery opening 1102B of the housing unit 11B to swing, and the first mounting pillars 1112B of the first housing 111B and the second mounting pillars 1122B of the second housing 112B are provided at an outside of the swing arm 13B to limit an outward swing magnitude of each of the swing arms 13B.

Preferably, the first mounting pillars 1112B of the first housing 111B and the second mounting pillars 1122B of the second housing 112B correspond to a gap between two adjacent magnetic elements 14B of a set of the magnetic elements 14B to keep clear of the magnetic elements 14B, such that the swing arm 13B is able to drive the set of the magnetic elements 14B to have a greater swing amplitude.

The housing unit 11B further has a center hole 1103B, the housing space 1101B is disposed around the center hole 1103B, and the housing space 1101B and the center hole 1103B are separated from each other, wherein a mounting shaft of the equipment rack 100B can be mounted in the center hole 1103B of the housing unit 11B.

When the driving unit 12B drives each of the swinging arms 13B to swing relative to the housing unit 11B, each of the swinging arms 13B is able to drive each set of the magnetic elements 14B to swing synchronously to change a relative distance between each set of the magnetic elements 14B and the flywheel 20B, so as to regulate the relative distance between the magnetic inductance lines of the internal magnetic control device 10B and the flywheel 20B so as to adjust the relative distance between the magnetic inductance lines of the internal magnetic control device 10B and the flywheel 20B, thereby adjusting the load obtained by the flywheel 20B while being driven to rotate.

Specifically, the relative distance between each set of the magnetic elements 14B and the flywheel 20B is adjusted to a design minimum when the driving unit 12B drives each of the swing arms 13B to swing outwardly to a maximum swing position, whereby the flywheel 20B cuts through a greatest amount magnetic inductance lines of each set of the magnetic elements 14B when being driven to rotate, and whereby the flywheel 20B is capable of obtaining a greatest resistance. Specifically, the relative distance between each set of the magnetic elements 14B and the flywheel 20B is adjusted to a design maximum when the driving unit 12B drives each of the swing arms 13B to swing inwardly to a minimum swing position, whereby the flywheel 20B cuts through a smallest amount magnetic inductance lines of each set of the magnetic elements 14B when being driven to rotate, and whereby the flywheel 20B is capable of obtaining a smallest resistance.

It is understood that in the course of the driving unit 12B driving each of the swing arms 13B to swing from the minimum swinging position to the maximum swinging position, respectively, the amount of the magnetic inductance lines of each set of the magnetic elements 14B cut by the flywheel 20B while being driven to rotate is gradually increased, so that the resistance obtained by the flywheel 20B while being driven to rotate is gradually increased. Correspondingly, in the course of the driving unit 12B driving each of the swing arms 13B to swing from the maximum swing position to the minimum swing position, respectively, the amount of the flywheel 20B that cuts through the magnetic inductance lines of each set of the magnetic elements 14B while being driven to rotate gradually decreases, so that the resistance obtained by the flywheel 20B while being driven to rotate gradually decreases.

With continued reference to FIGS. 10A to 13B of the accompanying drawings, the driving unit 12B of the internal magnetic control device 10B further comprises a driving motor 121B, a driving ring 125B, and two connecting arms 123B. The driving motor 121B is mounted in the housing space 1101B of the housing unit 11B. The driving ring 125B is slidably mounted in the housing space 1101B of the housing unit 11B and the driving ring 125B is rotatably mounted at an output shaft 1211B of the driving motor 121B. One end of each of the connecting arms 123B is rotatably mounted to each of two opposite sides of the driving ring 125B, and another end of each the connecting arm 123B is rotatably mounted to the driven end 132B of each of the swing arms 13B. When the driving motor 121B drives the driving ring 125B to rotate around a central axis, the driving ring 125B drives each of the swing arms 13B to swing through each of the connecting arms 123B, respectively, so as to regulate the relative distance between the magnetic inductance lines of the internal magnetic control device 10B and the flywheel 20B.

Figure 13A:
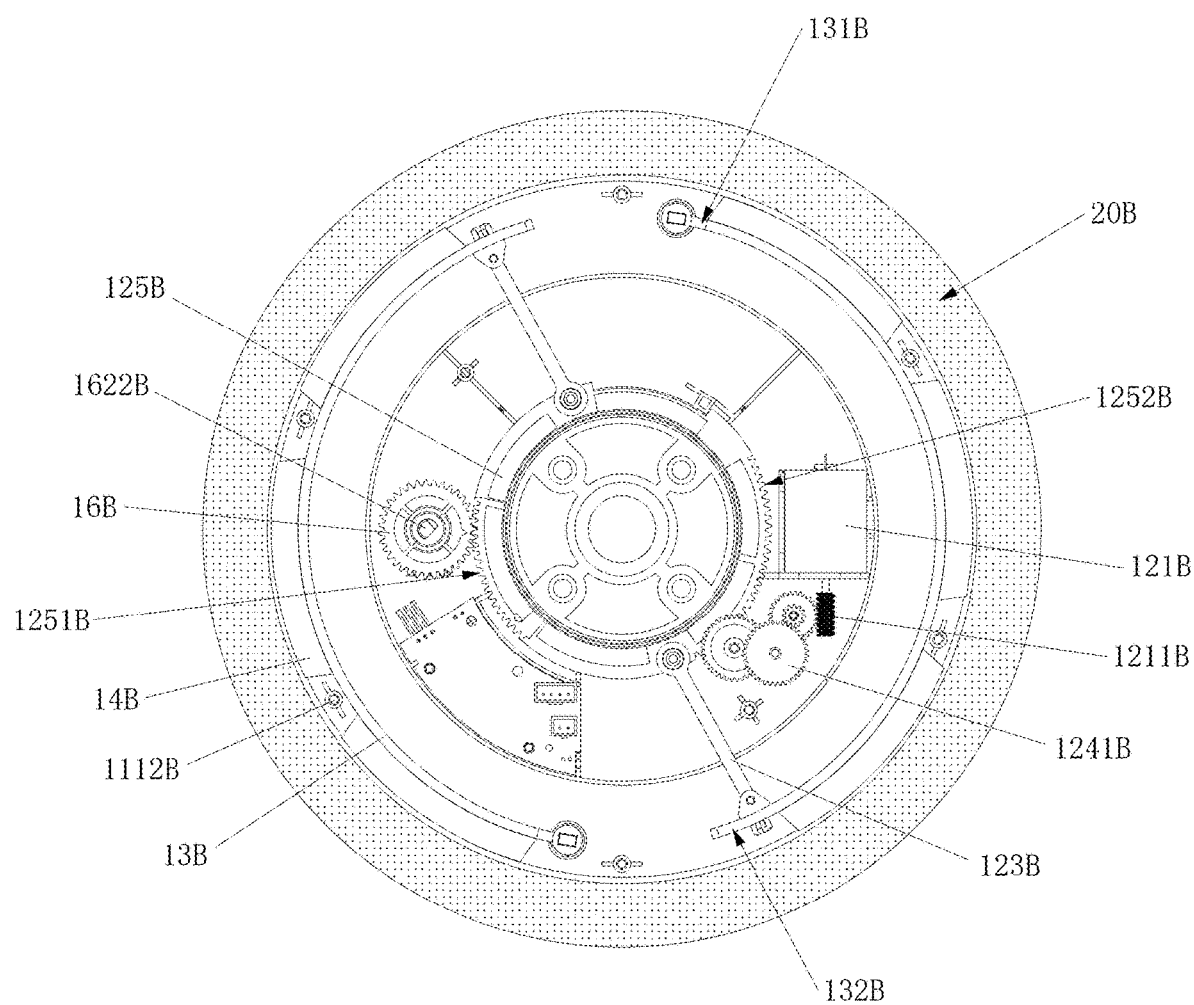
FIG. 13A is a top schematic diagram of a local structure of the flywheel assembly according to the above another preferred embodiment of the present invention, which is under one state.
Figure 13B:
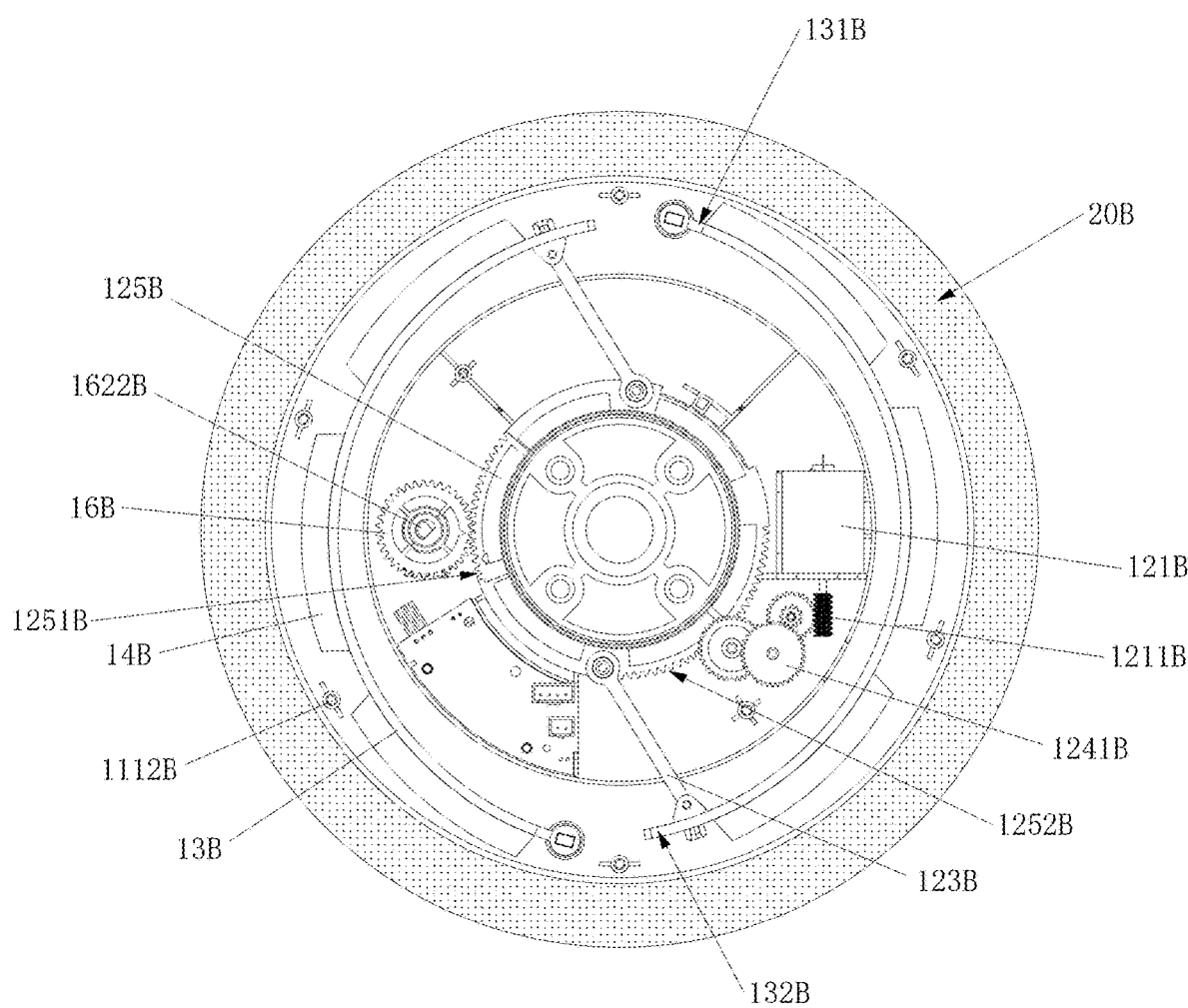
FIG. 13B is a top schematic diagram of a local structure of the flywheel assembly according to the above preferred embodiment of the present invention, which is under another state.

Specifically, refer to FIG. 13A, when the driving motor 121B drives the driving ring 125B to rotate clockwise, the driving ring 125B drives each swing arm 13B to swing inwardly through each connecting arm 123B to allow each of swing arms 13B to swing from a maximum swing position to a minimum swing position, correspondingly, when the driving motor 121B drives the driving ring 125B to rotate counterclockwise, the driving ring 125B drivers each of the swing arms 13B to swing outwardly through each of the connecting arms 123B to allow each of swing arms 13B to swing from the minimum swing position to the maximum swing position.

In this specific example of the flywheel assembly 300B, which is illustrated in FIGS. 10A to 13B of the accompanying drawings, the driving motor 121B of the driving unit 12B is fixedly mounted to the first housing 111B of the housing unit 11B. The first housing 111B has a convex platform 1113B, where the driving ring 125B is rotatably provided around the convex platform 1113B of the first housing 111B, so the driving ring 125B can be driven to rotate around a central axis.

It is worth mentioning that the way the ends of the connecting arms 123B of the driving unit 12B are provided at the driven end 132B of each swing arm 13B is not limited in the flywheel assembly 300B of the present invention. For example, the internal magnetic control device 10B further includes two assembling bodies 15B, wherein the connecting arms 123B of the driving unit 12B are rotatably installed in the assembling bodies 15B, and the assembling bodies 15B are installed at the driven end 132B of each swing arm 13B, respectively, so that the end of the connecting arm 123B can be installed at the driven end 132B of each swing arm 13B.

Further, With continued reference to FIGS. 10A to 13B of the accompanying drawings, the driving unit 12B further includes a transmission gear assembly 124B, which is used to transmit a power output by the output shaft 1211B of the driving motor 121B to the driving ring 125B to drive the driving ring 125B to rotate a center axis with respect to the housing unit 11B, so as to drive the swing arms 13B to swing inwardly or outwardly.

Specifically, the driving ring 125B has a column of first ring teeth 1251B, wherein the transmission gear assembly 124B comprises a plurality of gears 1241B engaged with each other in sequence, wherein one gear 1241B of the plurality of gears 1241B is engaged with the output shaft 1211B of the driving motor 121B, another gear 1241B of the plurality of gears 1241B is engaged with the first ring teeth 1251B of the driving ring 125B, so when the driving motor 121B outputs the power in the way of rotation of the output shaft 1211B of the driving motor 121B, the power can be passed to the driving ring 125B through the transmission gear assembly 124B to drive the driving ring 125B to rotate around the center axis with respect to the housing unit 11B, so as to drive the swing arms 13B to swing inwardly or outwardly.

It is worth mentioning that the amount of the gears 1241B of the transmission gear assembly 124B is not limited in the flywheel assembly 300B of the present invention. For example, in the specific example of the flywheel assembly 300B shown in FIGS. 10A to 13B, the transmission gear assembly 124B has three gears 1241B.

With continued reference to FIGS. 10A to 13B of the accompanying drawings, the driving unit 12B further includes an auxiliary gear 126B, wherein the auxiliary gear 126B is rotatably installed in the housing space 1101B of the housing unit 11B, wherein the driving ring 125B has a column of second ring teeth 1252B, which the auxiliary gear 126B is engaged with the second ring teeth 1252B to avoid the driving ring 125B tilt when the driving ring 125B is driven, so as to ensure the driving ring 125B stably and reliably to rotate around a center axis with respect to the housing unit 11B.

With continued reference to FIGS. 10A to 13B of the accompanying drawings, the internal magnetic control device 10B further includes a potential control unit 16B, wherein the potential control unit 16B includes a circuit board 161B, wherein the circuit board 161B is provided in the housing space 1101B of the housing unit 11B, the driving motor 121B of the driving unit 12B is connected to the circuit board 161B of the potential control unit 16B. Preferably, the circuit board 161B is fixedly installed in the first housing 111B of the housing unit 11B.

The potential control unit 16B further includes a rotary potentiometer 163B, which is connected to the circuit board 161B, and the rotary potentiometer 163B has an installation end 1631B and a shaft end 1632B, wherein the installation end 1631B of the rotary potentiometer 163B is installed in the first housing 111B, the auxiliary gear 126B is provided at the shaft end 1632B of the rotary potentiometer 163B, so that the auxiliary gear 126B is provided in the housing space 1101B of the housing unit 11B. When the driving motor 121B drives each of the connecting arms to drive each of the swing arms 13B to rotate inwardly or outwardly or outward 126B through the driving ring 125B, the driving ring 125B drives the auxiliary gear 126B to rotate, and at the same time, the auxiliary gear 126B drives the shaft end 1632B of the rotary potentiometer 163B to change the resistance value of the rotating potentiometer 163B. It can be understood that the resistance value of the rotary potentiometer 163B is related to the rotation position of the driving ring 125B, and the rotation position of the driving ring 125B determines the swing position of the swing arms 13B and the position of the magnetic elements 14B, so as to the load of the flywheel 20B while being driven to rotate. In other words, the position of the internal magnetic control device 10B of the flywheel assembly 300B of the present invention and the position of the magnetic component 14B and the load of the flywheel 20B can be detected and determined by detecting the resistance value of the rotary potentiometer 162B when the flywheel 20B is drive to rotate.

Figure 14:
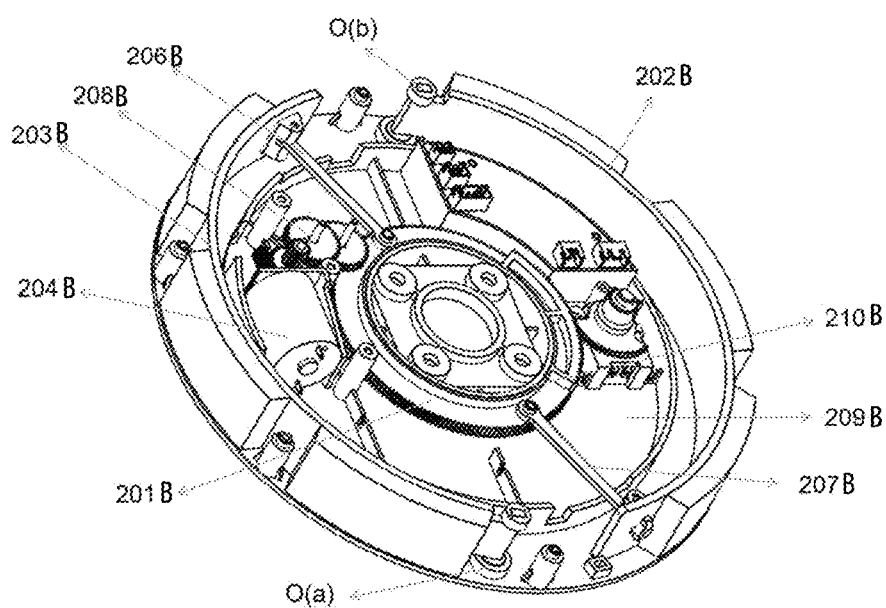
FIG. 14 is a perspective schematic diagram of a modification of the internal magnetic control device of the flywheel assembly according to the above preferred embodiments of the present invention.

FIG. 14 illustrates a modification of the internal magnetic control device 10B, wherein when a motor 204B is applied to a voltage, a driving mechanism 208B drives a rotating wheel 201B to rotate, a ring sleeve 210B and a base are integrated, and the base is sleeved by the ring sleeve 210B thereon, when the rotating wheel 201B rotates, it drives the connecting rods 206B, 207B to pull or push magnetic rings 202B, 203B connected with the connecting rods 206B, 207B, wherein the magnetic ring 203B rotates around an axis O(a), the magnetic ring 202B rotates around an axis O(b).

As a preferable example, the driving mechanism 208B is a driving gear assembly to drive through gears thereof.

As a preferable example, the number of the connecting rods 206B, 207B can be one or more, the connecting rods 206b, 207B are arranged at the rotating wheel 201B symmetrically and connected with the magnetic rings 202B, 203B.

As a preferable example, the number of the magnetic rings 202B, 203B is one or more, wherein one end of each of the magnetic rings 202B, 203B can be rotatably provided on the base, and another end each of the magnetic rings 202B, 203B is a free end and is driven to move by the connecting rods 206B, 207B.

As a preferable example, the magnetic ring 202B, 203B is provided on the base reverse-symmetrically.

Those skilled in the art should understand that the embodiments of the present invention shown in the above description and the accompanying drawings are only examples and do not limit the present invention. The objects of the present invention have been completely and effectively realized. The function and structural principle of the present invention have been shown and explained in the above embodiments. Without departing from the principle, the embodiments of the present invention can be deformed or modified.

What is claimed is:

1. A flywheel assembly, comprising:
a flywheel having a flywheel disc, a flywheel ring and a flywheel space, wherein the flywheel ring is integrally extended along a periphery of the flywheel disc and the flywheel ring are provided to surround the flywheel space; and
an internal magnetic control device provided in the flywheel space, wherein the internal magnetic control device comprises a housing unit having a periphery opening, two swing arms, a driving unit for driving the two swing arms to swing respectively and two sets of magnetic elements, wherein the driving unit is provided at the housing unit, wherein the two swing arms are respectively arranged in the periphery opening and each of the two swing arms has a pivoting end and a driven end, wherein the pivoting end is pivotably mounted at the housing unit, the driven end is pivotably connected to the driving unit, so that each of the two swing arms is capable of being driven to swing with respect to the flywheel ring, wherein the two sets of the magnetic elements are arranged at the two swing arms to provide a magnetic field in the periphery opening and provided to swing synchronously with the two swinging arms, respectively, wherein the driving unit further comprise a driving motor, a driving ring and two connecting arms, wherein the driving ring is capable of being driven to rotate around a central axis, wherein one end of each of the connecting arms is pivotably mounted at the driving ring, and another end of each of the two connecting arms is pivotably mounted at the driven end of corresponding swing arm, wherein the driving ring is rotatably mounted at an output shaft of the driving motor so that the driving motor is capable of being driven to rotate around the central axis to drive the two swing arms to swing with respect the flywheel ring through the two connecting arms, respectively, wherein the driving unit further comprises a transmission gear assembly, the driving ring has a column of first ring teeth, wherein the transmission gear assembly comprises a plurality of gears engaged with each other in sequence, wherein one gear of the plurality of gears is engaged with the output shaft of the driving motor, another gear of the plurality of gears is engaged with the driving ring through the first ring teeth, wherein the driving unit further comprises at least one auxiliary gear, the driving ring has a column of second ring teeth, which the at least one auxiliary gear is rotatably engaged with the driving ring through the second ring teeth to ensure the driving ring stably and reliably to rotate around the center axis with respect to the housing unit.

2. An internal magnetic control device, adapted for a flywheel assembly, comprising:
a housing unit having a periphery opening;
two swing arms;
a driving unit for driving the two swing arms to swing respectively; and
two sets of magnetic elements, wherein the driving unit is provided at the housing unit, wherein the two swing arms are respectively arranged in the periphery opening and each of the two swing arms has a pivoting end and a driven end, wherein the pivoting end is pivotably mounted at the housing unit, the driven end is pivotably connected to the driving unit, so that each of the two swing arms is capable of being driven to swing, wherein the two sets of the magnetic elements are arranged at the two swing arms to provide a magnetic field in the periphery opening and provided to swing synchronously with the two swinging arms, respectively, wherein the driving unit further comprise a driving motor, a driving ring and two connecting arms, wherein the driving ring is capable of being driven to rotate around a central axis, wherein one end of each of the connecting arms is pivotably mounted at the driving ring, and another end of each of the two connecting arms is pivotably mounted at the driven end of corresponding swing arm, wherein the driving ring is rotatably mounted at an output shaft of the driving motor so that the driving motor is capable of being driven to rotate around the central axis to drive the two swing arms to swing through the two connecting arms, respectively, wherein the driving unit further comprises a transmission gear assembly, the driving ring has a column of first ring teeth, wherein the transmission gear assembly comprises a plurality of gears engaged with each other in sequence, wherein one gear of the plurality of gears is engaged with the output shaft of the driving motor, another gear of the plurality of gears is engaged with the driving ring through the first ring teeth, wherein the driving unit further comprises at least one auxiliary gear, the driving ring has a column of second ring teeth, which the at least one auxiliary gear is rotatably engaged with the driving ring through the second ring teeth to ensure the driving ring stably and reliably to rotate around the center axis with respect to the housing unit.

* * * * *